United States Patent
Ueda et al.

(10) Patent No.: US 9,415,686 B2
(45) Date of Patent: Aug. 16, 2016

(54) DISPLAY CONTROL APPARATUS

(71) Applicants: Yoshihiro Ueda, Kariya (JP); Hitoshi Sugiyama, Anjo (JP); Shigeo Katoh, Kariya (JP)

(72) Inventors: Yoshihiro Ueda, Kariya (JP); Hitoshi Sugiyama, Anjo (JP); Shigeo Katoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 113 days.

(21) Appl. No.: 14/361,737

(22) PCT Filed: Dec. 25, 2012

(86) PCT No.: PCT/JP2012/008262
§ 371 (c)(1),
(2) Date: May 30, 2014

(87) PCT Pub. No.: WO2013/099216
PCT Pub. Date: Jul. 4, 2013

(65) Prior Publication Data
US 2014/0340212 A1 Nov. 20, 2014

(30) Foreign Application Priority Data

Dec. 28, 2011 (JP) .................................. 2011-288067
Dec. 12, 2012 (JP) .................................. 2012-271465

(51) Int. Cl.
*B60K 37/02* (2006.01)
*B60K 35/00* (2006.01)
(Continued)

(52) U.S. Cl.
CPC .............. *B60K 37/02* (2013.01); *B60K 35/00* (2013.01); *G01C 21/36* (2013.01); *G06F 3/1423* (2013.01);
(Continued)

(58) Field of Classification Search
CPC .. G01C 21/3602; G01C 21/36; H04N 21/472; B60K 35/00; B60K 2350/1096; B60K 2350/352; B60K 37/02; G06F 5/00; G06F 3/1423; G09G 2380/10

USPC ............ 340/426.14, 426.15, 438, 459, 425.5, 340/461
See application file for complete search history.

(56) References Cited

U.S. PATENT DOCUMENTS 5,757,268 A 5/1998 Toffolo et al.
6,710,789 B1 3/2004 Sekiguchi et al.
(Continued)

FOREIGN PATENT DOCUMENTS

JP 10-287188 A 10/1998
JP 10-297319 A 11/1998
(Continued)

OTHER PUBLICATIONS

Office Action mailed on Jan. 27, 2015 in corresponding JP application No. 2012-176322 (with English translation).
(Continued)

*Primary Examiner* — John Q Nguyen
*Assistant Examiner* — Michael Kerrigan
(74) *Attorney, Agent, or Firm* — Posz Law Group, PLC

(57) ABSTRACT

A display control apparatus, with respect to multiple display areas of a display screen of a display apparatus, assigns one display image to one of the display areas by performing a predetermined calculation. The display control apparatus includes a display image managing section storing image information related to the display image, a display area managing section storing area information related to each display area, a mandatory exclusion information storing section storing mandatory exclusion information that defines multiple display image combinations so that the display image is included in each of the display image combinations, and a display image assignment control section. The display image assignment control section, based on the mandatory exclusion information, determines the display image combinations, generates a display image combination list, and assigns the display image to the display area based on the display image combination list.

12 Claims, 34 Drawing Sheets

(51) Int. Cl.
*G06F 3/14* (2006.01)
*G01C 21/36* (2006.01)
*H04N 21/472* (2011.01)
*G06F 5/00* (2006.01)

(52) U.S. Cl.
CPC ... *B60K 2350/1096* (2013.01); *B60K 2350/352* (2013.01); *G01C 21/3602* (2013.01); *G06F 5/00* (2013.01); *G09G 2380/10* (2013.01); *H04N 21/472* (2013.01)

(56) References Cited

U.S. PATENT DOCUMENTS

| | | | |
|---|---|---|---|
| 7,065,712 | B2 | 6/2006 | Muto et al. |
| 7,136,749 | B2 | 11/2006 | Ichihara et al. |
| 8,548,677 | B2 | 10/2013 | Sugiyama et al. |
| 8,619,092 | B2 | 12/2013 | Yamauchi |
| 2002/0100058 | A1 | 7/2002 | Hirose et al. |
| 2003/0086619 | A1 | 5/2003 | Nagaishi |
| 2005/0179711 | A1 | 8/2005 | Yoshida |
| 2005/0284984 | A1 | 12/2005 | De Lauzun et al. |
| 2007/0113175 | A1 | 5/2007 | Iwasaki |
| 2008/0211654 | A1 | 9/2008 | Kasamatsu |
| 2008/0250027 | A1 | 10/2008 | Hirose et al. |
| 2009/0115592 | A1 | 5/2009 | Miake et al. |
| 2010/0117810 | A1 | 5/2010 | Hagiwara et al. |
| 2010/0164698 | A1 | 7/2010 | Tsubooka et al. |
| 2010/0245071 | A1* | 9/2010 | Fujisawa ............... B60K 35/00 340/461 |
| 2011/0035145 | A1 | 2/2011 | Yamasaki |
| 2012/0215404 | A1 | 8/2012 | Sugiyama et al. |
| 2014/0114531 | A1 | 4/2014 | Sugiyama et al. |

FOREIGN PATENT DOCUMENTS

| | | | |
|---|---|---|---|
| JP | H11-282834 A | 10/1999 |
| JP | H11-311545 A | 11/1999 |
| JP | 2004-042683 A | 2/2004 |
| JP | 2006-285434 A | 10/2006 |
| JP | 2007-145137 A | 6/2007 |
| JP | 2007-299325 A | 11/2007 |
| JP | 2008-301264 A | 12/2008 |
| JP | 2009-223061 A | 10/2009 |
| JP | 2010-015300 A | 1/2010 |
| JP | 2011-055343 A | 3/2011 |
| JP | 2011-141699 A | 7/2011 |
| JP | 2011-193040 A | 9/2011 |
| JP | 2011-204023 A | 10/2011 |
| JP | 2013-137643 A | 7/2013 |
| WO | 2013/061577 A1 | 2/2013 |
| WO | 2013/061576 A1 | 5/2013 |

OTHER PUBLICATIONS

Office Action mailed May 12, 2015 issued in corresponding JP patent application No. 2012-271465 (and English translation).
Office Action mailed Mar. 12, 2015 in the related U.S. Appl. No. 14/235,187 (US 2014/0152433).
Office Action in the related co-pending U.S. Appl. No. 14/127,713.
Office Action mailed Oct. 6, 2015 in the corresponding JP application No. 2012-176322 (with English translation).
Office Action mailed Feb. 24, 2015 issued in corresponding JP paten application No. 2012-271465 (and English translation).
U.S. Appl. No. 14/235,187, Jan. 27, 2014, Sugiyama et al.
U.S. Appl. No. 14/353,154, Apr. 21, 2014, Ueda et al.
U.S. Appl. No. 14/353,372, Apr. 22, 2014, Ueda et al.
International Search Report and Written Opinion of the International Searching Authority mailed Nov. 13, 2012 for the related international application No. PCT/JP2012/005079 (with English translation).
Written Opinion of the International Preliminary Examining Authority mailed Jun. 25, 2013 for the related international application No. PCT/JP2012/005079 (with English translation).
International Preliminary Examination Report mailed Nov. 26, 2013 in the related international application No. PCT/JP2012/005079 (with English translation).
International Search Report of the International Searching Authority mailed Nov. 13, 2012 for the related international application No. PCT/JP2012/005080 (with English translation).
Written Opinion of the International Searching Authority mailed Nov. 13, 2012 for the related international application No. PCT/JP2012/005080 (with English translation).
Written Reply dated Nov. 13, 2012 for the related international application No. PCT/JP2012/005080 (with English translation).
Written Opinion of the International Preliminary Examination Authority mailed Jun. 25, 2013 for the related international application No. PCT/JP2012/005080 (with English translation).
Written Reply in PCT/JP2012/005079 received by the JPO on May 8, 2013 (with English translation).
Amendment in PCT/JP2012/005079 received by the JPO on May 8, 2013 (with English translation.
International Search Report of the International Searching Authority mailed Nov. 27, 2012 for the related international application No. PCT/JP2012/006775 (with English translation).
Written Opinion of the International Preliminary Examination Authority mailed Nov. 27, 2012 for the related international application No. PCT/JP2012/006775 (with English translation).
International Preliminary Examination Report mailed Sep. 10, 2013 in the related international application No. PCT/JP2012/006775 (with English translation).
Office Action mailed on Nov. 12, 2013 in related JP Application No. 2012-187566 (with English Translation).
Office Action mailed on Dec. 17, 2013 in related JP Application No. 2012-187564 (with English Translation).
Office Action mailed on Nov. 26, 2013 in related JP Application No. 2012-230960 (with English Translation).
International Search Report mailed Nov. 27, 2012 in related PCT application No. PCT/JP20121006776 (with English Translation).
Written Opinion mailed Nov. 27, 2012 in related PCT application No. PCT/JP2012/006776 (with English Translation).
Office Action mailed May 7, 2014 in the related JP application No. 2012-187564 (with English translation).
International Search Report of the International Searching Authority mailed Apr. 9, 2013 in corresponding international application No. PCT/JP2012/008262. (with English translation).
Written Opinion mailed Apr. 9, 2013 in corresponding PCT application No. PCT/JP2012/008262. (with English translation).
Office Action issued by U.S. Patent Office on Nov. 16, 2015 in connection with related U.S. Appl. No. 14/353,372.

* cited by examiner

FIG. 4(a)

VISUAL LINE APTNESS TABLE

| | | | DISPLAY IMAGE | | |
|---|---|---|---|---|---|
| | | 1 | 2 | 3 | 4 | 5 |

<br>

AREA

| | 1 | 2 | 3 | 4 | 5 |
|---|---|---|---|---|---|
| 1 | 10 | 8 | 6 | 4 | 2 |
| 2 | 10 | 10 | 8 | 6 | 4 |
| 3 | 10 | 10 | 10 | 8 | 6 |
| 4 | 10 | 10 | 10 | 10 | 8 |
| 5 | 10 | 10 | 10 | 10 | 10 |

FIG. 4(b)

EXPRESSIVENESS APTNESS TABLE

DISPLAY IMAGE

AREA

| | 1 | 2 | 3 | 4 | 5 |
|---|---|---|---|---|---|
| 1 | 10 | 8 | 6 | 4 | 2 |
| 2 | 10 | 10 | 8 | 6 | 4 |
| 3 | 10 | 10 | 10 | 8 | 6 |
| 4 | 10 | 10 | 10 | 10 | 8 |
| 5 | 10 | 10 | 10 | 10 | 10 |

FIG. 4(c)

OPERABILITY APTNESS TABLE

DISPLAY IMAGE

AREA

| | 1 | 2 | 3 | 4 | 5 |
|---|---|---|---|---|---|
| 1 | 10 | 0 | 0 | 0 | 0 |
| 2 | 10 | 10 | 8 | 6 | 4 |
| 3 | 10 | 10 | 10 | 8 | 6 |
| 4 | 10 | 10 | 10 | 10 | 8 |
| 5 | 10 | 10 | 10 | 10 | 10 |

FIG. 5(a)

| A | B | & | \| | ^ | / | + |
|---|---|---|---|---|---|---|
| 0 | 0 | 0 | 0 | 0 | 1 | 1 |
| 0 | 1 | 0 | 1 | 1 | 1 | 0 |
| 1 | 0 | 0 | 1 | 1 | 1 | 0 |
| 1 | 1 | 1 | 1 | 0 | 0 | 1 |

FIG. 5(b)

| EXPRESSION | MEANING | OPTION |
|---|---|---|
|  | A, B ARE ACTIVE | A, B, C ARE ACTIVE |
| A & B | INCLUDE BOTH A AND B NECESSARILY | AB, ABC |
| A + B | INCLUDE BOTH A AND B NECESSARILY, OR INCLUDE NEITHER A NOR B | AB, ABC, C, NONE |
| A \| B | INCLUDE AT LEAST ONE OF A OR B OR AB NECESSARILY | A, B, AB, AC, BC, ABC |
| A ^ B | INCLUDE ONE OF A OR B NECESSARILY | A, B, AC, BC |
| A / B | INCLUDE ONE OF A OR B NECESSARILY, OR INCLUDE NEITHER A NOR B | A, B, AC, BC, C, NONE |

FIG. 11(a)

| AREA COMBINATION LIST |
|---|
| a |
| b , c |
| b , f , g |
| c , d , e |
| d , e , f , g |

FIG. 11(b)

| DISPLAY IMAGE COMBINATION LIST |
|---|
| X , W |
| Z , W |

FIG. 11(c)

| ASSIGNMENT INFORMATION |
|---|
| X – a<br>X – b |
| Z – a<br>Z – c |
| W – b<br>W – d |

FIG. 11(d)

| ASSIGNMENT COMBINATION LIST |
|---|
| X – a |
| Z – a |
| X – b |
| Z – c , W – b |
| ... |

| AREA NAME | AREA APTNESS |
|---|---|
| AREA b | 50 |
| AREA c | 100 |
| AREA d | 20 |
| AREA e | 30 |
| AREA f | 90 |
| AREA g | 80 |

| AREA LIST |
|---|
| b,c |
| b,f,g |
| c,d,e |
| d,e,f,g |

| DISPLAY IMAGE | DISPLAY IMAGE VALUE |
|---|---|
| ANALOGUE SPEEDOMETER | 70 |
| DIGITAL SPEEDOMETER | 50 |
| MAP | 20 |
| NIGHT VIEW | 100 |

FIG. 15

| DISPLAY IMAGE | AREA |
|---|---|
| ANALOGUE SPEEDOMETER | c |
| DIGITAL SPEEDOMETER | d |
| DIGITAL SPEEDOMETER | f |
| MAP | b |
| MAP | d |
| MAP | e |
| NIGHT VIEW | e |
| NIGHT VIEW | g |

FIG. 16(a)

| DISPLAY IMAGE | DISPLAY IMAGE VALUE | DISPLAY STATE |
|---|---|---|
| ANALOGUE SPEEDOMETER | 70 | ACTIVE |
| DIGITAL SPEEDOMETER | 50 | ACTIVE |
| MAP | 20 | ACTIVE |
| NIGHT VIEW | 100 | INACTIVE |

FIG. 16(b)

| DISPLAY IMAGE COMBINATION LIST |
|---|
| ANALOGUE |
| DIGITAL |
| ANALOGUE, MAP |
| DIGITAL, MAP |

| ASSIGNMENT COMBINATION LIST | | EVALUATION VALUE |
|---|---|---|
| (1) | ANALOGUE-c | 7000 |
| (2) | MAP-b, ANALOGUE-c | 8000◎ |
| (3) | DIGITAL-f | 4500 |
| (4) | MAP-b, DIGITAL-f | 5500 |
| (5) | DIGITAL-d | 1000 |
| (6) | ANALOGUE-c, MAP-d | 7400 |
| (7) | ANALOGUE-c, MAP-e | 7600 |
| (8) | DIGITAL-d, MAP-e | 1600 |
| (9) | MAP-d, DIGITAL-f | 4900 |
| (10) | MAP-e, DIGITAL-f | 5100 |

FIG. 18(a)

| DISPLAY IMAGE | DISPLAY IMAGE VALUE | DISPLAY STATE |
|---|---|---|
| ANALOGUE SPEEDOMETER | 70 | ACTIVE |
| DIGITAL SPEEDOMETER | 50 | ACTIVE |
| MAP | 20 | ACTIVE |
| NIGHT VIEW | 100 | ACTIVE |

FIG. 18(b)

| DISPLAY IMAGE COMBINATION LIST |
|---|
| ANALOGUE |
| DIGITAL |
| ANALOGUE, MAP |
| DIGITAL, MAP |
| ANALOGUE, NIGHT VIEW |
| DIGITAL, NIGHT VIEW |
| ANALOGUE, MAP, NIGHT VIEW |
| DIGITAL, MAP, NIGHT VIEW |

FIG. 19

| | ASSIGNMENT COMBINATION LIST | EVALUATION VALUE |
|---|---|---|
| (1) | ANALOGUE-c | 7000 |
| (2) | MAP-b, ANALOGUE-c | 8000 |
| (3) | DIGITAL-f | 4500 |
| (4) | MAP-b, DIGITAL-f | 5500 |
| (5) | DIGITAL-f, NIGHT VIEW-g | 12500 |
| (6) | MAP-b, DIGITAL-f, NIGHT VIEW-g | 13500◎ |
| (7) | DIGITAL-d | 1000 |
| (8) | ANALOGUE-c, MAP-d | 7400 |
| (9) | ANALOGUE-c, MAP-e | 7600 |
| (10) | DIGITAL-d, MAP-e | 1600 |
| (11) | ANALOGUE-c, NIGHT VIEW-e | 10000 |
| (12) | DIGITAL-d, NIGHT VIEW-e | 4000 |
| (13) | ANALOGUE-c, MAP-d, NIGHT VIEW-e | 10400 |
| (14) | DIGITAL-d, NIGHT VIEW-g | 9000 |
| (15) | DIGITAL-d, MAP-e, NIGHT VIEW-g | 9600 |
| (16) | MAP-d, DIGITAL-f | 4900 |
| (17) | MAP-e, DIGITAL-f | 5100 |
| (18) | NIGHT VIEW-e, DIGITAL-f | 7500 |
| (19) | MAP-d, NIGHT VIEW-e, DIGITAL-f | 7900 |
| (20) | MAP-d, DIGITAL-f, NIGHT VIEW-g | 12900 |
| (21) | MAP-e, DIGITAL-f, NIGHT VIEW-g | 13100 |

FIG. 21(a)

| DISPLAY IMAGE | DISPLAY IMAGE VALUE | DISPLAY STATE |
|---|---|---|
| ANALOGUE SPEEDOMETER | 70 | ACTIVE |
| DIGITAL SPEEDOMETER | 50 | ACTIVE |
| MAP | 20 | ACTIVE |
| NIGHT VIEW | 100 | INACTIVE |

FIG. 21(b)

| DISPLAY IMAGE COMBINATION LIST |
|---|
| ANALOGUE |
| DIGITAL |
| ANALOGUE, MAP |
| DIGITAL, MAP |
| MAP |

| ASSIGNMENT COMBINATION LIST | | EVALUATION VALUE |
|---|---|---|
| (1) | ANALOGUE-c | 7000 |
| (2) | MAP-b, ANALOGUE-c | 8000◎ |
| (3) | MAP-b | 1000 |
| (4) | DIGITAL-f | 4500 |
| (5) | MAP-b, DIGITAL-f | 5500 |
| (6) | DIGITAL-d | 1000 |
| (7) | ANALOGUE-c, MAP-d | 7400 |
| (8) | ANALOGUE-c, MAP-e | 7600 |
| (9) | DIGITAL-d, MAP-e | 1600 |
| (10) | MAP-d | 400 |
| (11) | MAP-e | 600 |
| (12) | MAP-d, DIGITAL-f | 4900 |
| (13) | MAP-e, DIGITAL-f | 5100 |

FIG. 23(a)

| DISPLAY IMAGE | DISPLAY IMAGE VALUE | DISPLAY STATE |
|---|---|---|
| ANALOGUE SPEEDOMETER | 70 | ACTIVE |
| DIGITAL SPEEDOMETER | 50 | ACTIVE |
| MAP | 20 | ACTIVE |
| NIGHT VIEW | 100 | ACTIVE |

FIG. 23(b)

| DISPLAY IMAGE COMBINATION LIST |
|---|
| ANALOGUE, DIGITAL |
| ANALOGUE, DIGITAL, MAP |
| ANALOGUE, DIGITAL, NIGHT VIEW |
| ANALOGUE, DIGITAL, MAP, NIGHT VIEW |

| | ASSIGNMENT COMBINATION LIST | EVALUATION VALUE |
|---|---|---|
| (1) | ANALOGUE-c, DIGITAL-d | 8000 |
| (2) | ANALOGUE-c, DIGITAL-d, MAP-e | 8600 |
| (3) | ANALOGUE-c, DIGITAL-d, NIGHT VIEW-e | 11000◎ |

FIG. 25(a)

| DISPLAY IMAGE | DISPLAY IMAGE VALUE | DISPLAY STATE |
|---|---|---|
| ANALOGUE SPEEDOMETER | 70 | ACTIVE |
| DIGITAL SPEEDOMETER | 50 | ACTIVE |
| MAP | 20 | ACTIVE |
| NIGHT VIEW | 100 | ACTIVE |

FIG. 25(b)

| DISPLAY IMAGE COMBINATION LIST |
|---|
| ANALOGUE, DIGITAL |
| ANALOGUE, DIGITAL, MAP |
| ANALOGUE, DIGITAL, NIGHT VIEW |
| ANALOGUE, DIGITAL, MAP, NIGHT VIEW |
| MAP |
| NIGHT VIEW |
| MAP, NIGHT VIEW |

| | ASSIGNMENT COMBINATION LIST | EVALUATION VALUE |
|---|---|---|
| (1) | MAP-b | 1000 |
| (2) | NIGHT VIEW-g | 8000 |
| (3) | MAP-b, NIGHT VIEW-g | 9000 |
| (4) | ANALOGUE-c, DIGITAL-d | 8000 |
| (5) | ANALOGUE-c, DIGITAL-d, MAP-e | 8600 |
| (6) | ANALOGUE-c, DIGITAL-d, NIGHT VIEW-e | 11000◎ |
| (7) | MAP-d | 400 |
| (8) | NIGHT VIEW-e | 3000 |
| (9) | MAP-d, NIGHT VIEW-e | 3400 |
| (10) | MAP-e | 1600 |
| (11) | MAP-d, NIGHT VIEW-g | 8400 |
| (12) | MAP-e, NIGHT VIEW-g | 9600 |

FIG. 27(a)

| DISPLAY IMAGE | DISPLAY IMAGE VALUE | DISPLAY STATE |
|---|---|---|
| ANALOGUE SPEEDOMETER | 70 | ACTIVE |
| DIGITAL SPEEDOMETER | 50 | ACTIVE |
| MAP | 20 | ACTIVE |
| NIGHT VIEW | 100 | INACTIVE |

FIG. 27(b)

| DISPLAY IMAGE COMBINATION LIST |
|---|
| ANALOGUE |
| DIGITAL |
| ANALOGUE, DIGITAL |
| ANALOGUE, MAP |
| DIGITAL, MAP |
| ANALOGUE, DIGITAL, MAP |

| ASSIGNMENT COMBINATION LIST | | EVALUATION VALUE |
|---|---|---|
| (1) | ANALOGUE-c | 7000 |
| (2) | MAP-b, ANALOGUE-c | 8000 |
| (3) | DIGITAL-f | 4500 |
| (4) | MAP-b, DIGITAL-f | 5500 |
| (5) | DIGITAL-d | 1000 |
| (6) | ANALOGUE-c, DIGITAL-d | 8000 |
| (7) | ANALOGUE-c, MAP-d | 7400 |
| (8) | ANALOGUE-c, MAP-e | 7600 |
| (9) | ANALOGUE-c, DIGITAL-d, MAP-e | 8600◎ |
| (10) | DIGITAL-d, MAP-e | 1600 |
| (11) | MAP-d, DIGITAL-f | 4900 |
| (12) | MAP-e, DIGITAL-f | 5100 |

DISPLAY CONTROL APPARATUS

CROSS REFERENCE TO RELATED APPLICATION

The present disclosure is a U.S. national stage application of PCT/JP2012/008262 filed on Dec. 25, 2012 and is based on Japanese patent applications No. 2011-288067 filed on Dec. 28, 2011 and No. 2012-271465 filed on Dec. 12, 2012, the contents of which are incorporated herein by reference.

TECHNICAL FIELD

The present disclosure relates to a display control apparatus displays vehicle information or the like on a display device provided in a compartment of a vehicle.

BACKGROUND ART

In a compartment of a vehicle, various information are provided. For example, the various information may include information indicating a vehicle state, such as a vehicle speed, an engine revolution speed, a shift position, fuel remaining, a water temperature or the like. For example, the various information may include a map for navigation, setting information of an air conditioning device, audio information or the like. Recently, the various information include a night view display for a driving assistance, and information of a mobile terminal carried into the vehicle.

The various information are displayed on a display device equipped to the vehicle, and the display device may be provided by multiple types of devices. For example, the display device may be provided by a head-up display, a liquid crystal display displaying the map for the navigation or the like. For example, a meter panel that shows the vehicle speed may be provided by a liquid crystal display, and is capable of displaying the various information. In this case, the meter panel may be deemed as a display device.

As described above, since a quantity of types of the various information has increased, it is realistically difficult to previously assume all display patterns. A display pattern defines, with respect to one information, a display device and a display region of the display device corresponding to a circumstance. When multiple display devices are equipped to the vehicle, it is more difficult to assume all display patterns. Hereinafter, the information displayed on the display device is referred to as display image, and the region of the display device in which the display image is displayed is referred to as a display area. The display area may also be simply referred to as an area.

In the invention disclosed in JP 2009-140488 A, a priority level is assigned to each display area of the display device, and the display area to display each display image is dynamically determined by comparing the priority level of each display area with one another. With this configuration, the display area for displaying each display image can be determined even though all combination patterns of display image and display area are not previously defined.

The display images include a display image that is necessary to be displayed even by displacing another display image. The display images include a display image indicating the same contents with another display image being currently displayed on one display area. In this case, a repeated display of the display image is considered to be not necessary. For example, the display image indicating "the vehicle speed" may include the display image A of an analogue speedometer and the display image D of a digital speedometer displaying the vehicle speed by numeric. In some types of vehicles, one of the display image A and the display image D is necessarily required to be displayed even by displacing another display image and the display image A and the display image D are required to be not displayed concurrently together.

However, in the technology disclosed in the above-described JP 2009-140488 A, each display image is assigned to the display area according to the priority level. Thus, in the technology disclosed in the above-described JP 2009-140488 A, the display images are difficult to be displayed based on a predetermined rule. For example, as described above, the display images are difficult to be displayed based on the predetermined rule in which one of the display image A and the display image D is required to be necessarily displayed and one of the display image A and the display image D is required to be not displayed when the other one of the display image A and the display image D is currently being displayed.

SUMMARY OF INVENTION

In view of the foregoing difficulties, it is an object of the present disclosure to provide a display control apparatus that is capable of assigning multiple display images to multiple display areas under a condition that the multiple display images displayed concurrently satisfy a predetermined relation.

According to an aspect of the present disclosure, a display control apparatus assigns, with respect to a plurality of display areas included in a display screen of a display apparatus, at least one display image to one of the plurality of display areas by performing a predetermined calculation. The display control apparatus includes a display image managing section, a display area managing section, a mandatory exclusion information storing section, and a display image assignment control section. The display image managing section stores an image information related to the at least one display image. The display area managing section stores an area information related to each of the plurality of display areas. The mandatory exclusion information storing section stores a mandatory exclusion information that is utilized in a determination of a plurality of display image combinations so that each of the plurality of display image combinations includes the at least one display image. The display image assignment control section determines the plurality of display image combinations based on the mandatory exclusion information and generates a display image combination list including the plurality of display image combinations, and assigns the at least one display image to the one of the plurality of display areas based on the display image combination list.

With the above display control apparatus, multiple display images can be assigned to the display areas under a condition that the multiple display images displayed concurrently satisfy a predetermined relation.

BRIEF DESCRIPTION OF DRAWINGS

The above and other objects, features and advantages of the present disclosure will become more apparent from the following detailed description made with reference to the accompanying drawings. In the drawings:

FIG. 4(a) is a diagram showing a visual line aptness table, FIG. 4(b) is a diagram showing an expressiveness aptness table, and FIG. 4(c) is a diagram showing an operability aptness;

FIG. 5(a) is a diagram showing a truth table of operators of mandatory exclusion constraint expressions, and FIG. 5(b) is a diagram showing operators of mandatory exclusion constraint expressions;

FIG. 11(a) is a diagram showing a display area combination list, FIG. 11(b) is a diagram showing a display image combination list, FIG. 11(c) is a diagram showing assignment information, and FIG. 11(d) is a diagram showing an assignment combination list;

FIG. 15 is a diagram showing assignment information used in an example of the display control process;

FIG. 16(a) is a diagram showing a display state of each display image, and FIG. 16(b) is a diagram showing a display image combination list generated based on an mandatory exclusion constraint expression of A^D;

FIG. 18(a) is a diagram showing a display state of each display image, and FIG. 18(b) is a diagram showing a display image combination list generated based on an mandatory exclusion constraint expression of A^D;

FIG. 19 is a diagram showing an assignment combination list;

FIG. 21(a) is a diagram showing a display state of each display image, and FIG. 21(b) is a diagram showing a display image combination list generated based on an mandatory exclusion constraint expression of A/D;

FIG. 23(a) is a diagram showing a display state of each display image; FIG. 23(b) is a diagram showing a display image combination list generated based on an mandatory exclusion constraint expression of A & D;

FIG. 25(a) is a diagram showing a display state of each display image, and FIG. 25(b) is a diagram showing a display image combination list generated based on an mandatory exclusion constraint expression of A+D;

FIG. 27(a) is a diagram showing a display state of each display image, and FIG. 27(b) is a diagram showing a display image combination list generated based on an mandatory exclusion constraint expression of A|D;

EMBODIMENTS FOR CARRYING OUT INVENTION

The following will describe embodiments of the present disclosure with reference to the drawings.

Figure 1:
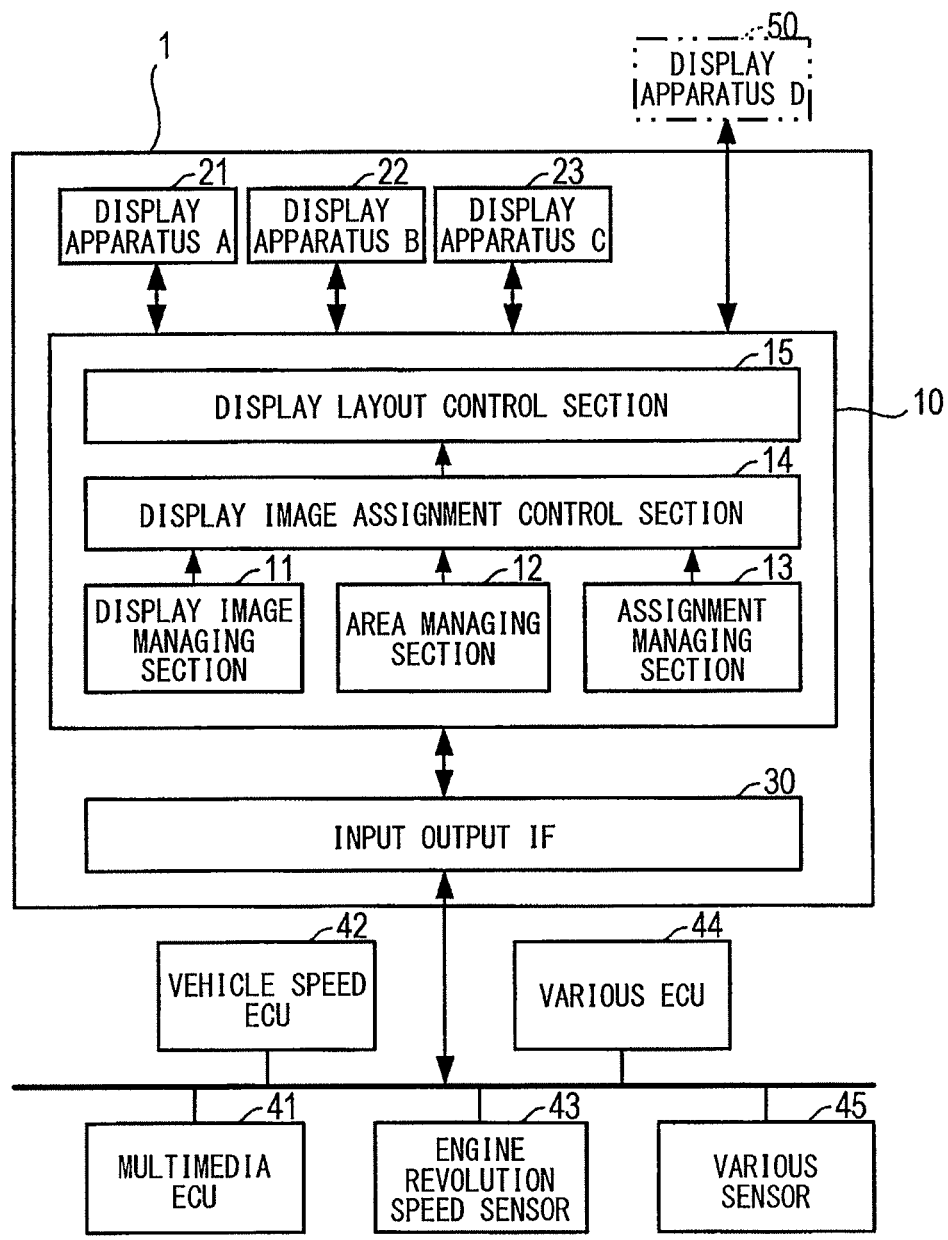
FIG. 1 is a block diagram showing a schematic configuration of a display control apparatus.

FIG. 1 is a block diagram showing a schematic configuration of a display control apparatus 1 according to the embodiment.

The display control apparatus 1 mainly includes a control unit 10. The control unit 10 is connected with three display apparatuses 21, 22, 23, and an input output IF 30. Hereinafter, in order to distinguish the three display apparatuses 21 to 23, the three display apparatuses 21 to 23 are referred to as "display apparatus A 21", "display apparatus B 22", and "display apparatus C 23", respectively. The information displayed on the display apparatus is referred to as display image, and a display region of the display apparatus in which the display image is displayed is referred to as a display area. The display area may also be simply referred to as an area.

The display apparatus A 21 may be provided by a head-up display. The display apparatus B 22 may be provided by a color liquid crystal display apparatus displaying navigation map. The display apparatus C 23 may be provided by a meter panel. The examples of the display apparatuses 21 to 23 are not limited.

The input output IF 30 is connected with an inside network of a vehicle, such as CAN. The display control apparatus 1, via the input output IF 30, is connected with a multimedia ECU 41, a vehicle speed ECU 42, an engine revolution speed sensor 43, various ECU 44, and various sensor 45. The various ECU 44 may include, for example, a navigation ECU. The various sensor 45 may include an outside temperature sensor detecting an air temperature outside a compartment of the vehicle and a temperature sensor detecting a temperature of engine cooling water.

With above-described configuration, the display control apparatus 1 is able to acquire various display images via the network. The various display images include a display image indicating "audio information" acquired from the multimedia ECU 41, a display image indicating "vehicle speed" acquired from the vehicle speed ECU 42, a display image indicating "engine revolution speed" acquired from the engine revolution speed sensor 43, a display image indicating "map" and "night view" acquired from the navigation ECU included in the various ECU 44, and a display image indicating "outside temperature" acquired from the outside temperature sensor included in the various sensor 45. The vehicle speed includes an analogue vehicle speed acquired from the "analogue speedometer" and a digital vehicle speed acquired from the "digital speedometer".

The control unit 10 includes a display image managing section 11, a display area managing section 12, an assignment managing section 13, a display image assignment control section 14, and a display layout control section 15.

Figure 2A:
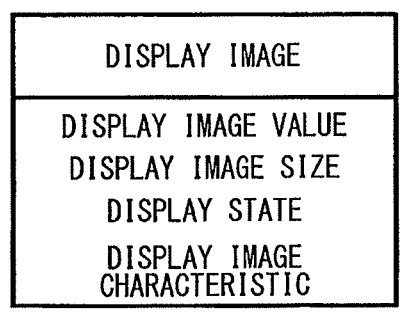
FIG. 2(a) is a diagram showing properties associated with a display image.

The display image managing section 11 has a function for managing above-described various display images. The display image managing section 11 manages the display images included in different categories in a similar manner. The display image managing section 11 includes a storage that stores the display image associated with four properties of the display image as shown in FIG. 2(a). The four properties of the display image include "display image value", "display image size", "display state", and "display image characteristic". Hereinafter, the properties of each display image is referred to as an image information.

The display image value in the present embodiment is a value of the display image with respect to each target user to which the display image is displayed. That is, the display image value indicates a usefulness degree of the display image to a specific target user compared with another display image. In the present embodiment, the target user may include a driver, a front seat passenger, or a rear seat passenger. That is, the display image values are different with respect to different target users. For example, the display image indicating the "vehicle speed" and the "engine revolution speed" has a high display image value (high usefulness degree) to the driver. Thus, the display image includes three display image values including a display image value "driver", a display image value "front seat passenger", and a display image value "rear seat passenger". Further, in the present embodiment, the display image value that is stored is set to a numerical value equal to or greater than "0".

The display image size is a size of a region to display the display image. For example, the display image size may be indicated by longitudinal pixel numbers and lateral pixel numbers.

The display image state is set as one of an active state or an inactive state based on a display flag of the display image. The display flag indicates whether the display image is a display target or not.

Specifically, each display image is switched between the "active state" and the "inactive state" based on information acquired from the vehicle. The information acquired from the vehicle includes a vehicle state, an operation performed by the user or the like. For example, when the shift range is R, the display image of the "back monitor" indicating image information taken by a rear view camera is set to "active state", and when the shift range is other than R, the display image of the "back monitor" is set to "inactive state". For example, when the user turns on an audio switch, the display image of the "audio information" on an audio control panel is set to "active state", and when the user turns off the audio switch, the display image of the "audio information" is set to "inactive state".

The display image characteristic indicates a characteristic required for the display area to enable a utilization of the display image by the user. In the present embodiment, the display image characteristic associated with each display image includes a visual line characteristic, an expressiveness characteristic, and an operability characteristic.

The visual line characteristic is set as an index to indicate whether the display image needs to be displayed on the display area at which the display image is easily viewable by the driver without moving the visual line. The visual line characteristic has 5 levels of values including "1" to "5". The display image that does not allow a movement of the visual line has a higher visual line characteristic value. The display image that does not allow the movement of the visual line is a display image need to be frequently confirmed during a traveling of the vehicle. For example, the display image that does not allow the movement of the visual line includes the "vehicle speed". The visual line characteristic of the display image is a characteristic with respect to the driver.

The expressiveness characteristic is set as an index to indicate whether expressiveness (resolution, color or the like) of the display area is necessary to display the display image. The expressiveness characteristic has 5 levels of values including "1" to "5". The display image that needs more expressiveness has a higher expressiveness characteristic value. The display image that needs more expressiveness is a display image including great amount of information. For example, the display image that needs more expressiveness may include the "map" for the navigation.

The operability characteristic indicates whether an operation is necessary to be performed with respect to the display image. The operability characteristic has 5 levels of values including "1" to "5". The display image that needs to be operated by the user has a higher operability characteristic value. For example, the display image that needs to be operated may include the "audio control panel" on which an audio file to be played back is selected by the user.

In the present embodiment, each characteristic has 5 levels of values including "1" to "5". However, the quantity of the levels of the characteristic is not limited. Each characteristic may include two or more levels of values.

Figure 2B:
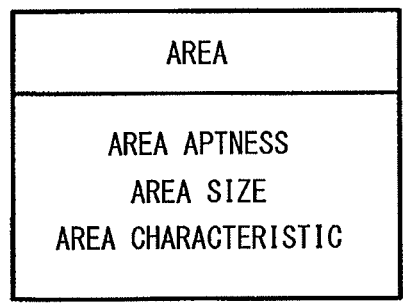
FIG. 2(b) is a diagram showing properties associated with a display area.

As shown in FIG. 1, the display area managing section 12 manages multiple display areas, which are the display regions to display the display images. The display areas in the present embodiment are set with respect to display screens of the three display apparatuses including the display apparatus A 21, the display apparatus B 22, and the display apparatus C 23. The display area managing section 12 manages each of the display areas of the three display apparatuses 21 to 23 of A to C in a similar manner. That is, the display area managing section 12 manages the display area of the display apparatus A 21 and the display area of the display apparatus B in a similar manner without differentiation. The display area managing section 12 includes a storage that stores three properties of each display area associated with corresponding display area. As shown in FIG. 2(b), the three properties of each display area include a "display area aptness", a "display area size", and a "display area characteristic". Hereinafter, the properties of the display area are referred to as area information.

The display area aptness is an index that indicates a visibility of the display area with respect to each target user to which the display area is faced. As described above, the target user includes the driver, the front seat passenger, or the rear seat passenger. That is, the display area aptness are different with respect to different target users. For example, the display area of the meter panel has a high display area aptness with respect to the driver. For example, the display area of the liquid crystal display apparatus displaying the map for the navigation has a high display area aptness with respect to the driver and the front seat passenger. Thus, the display area aptness includes three types of display area aptness including a display area aptness "driver", a display area aptness "front seat passenger", and a display area aptness "rear seat passenger". In the present embodiment, the display area aptness has 10 levels of values including "1" to "10". However, the quantity of the levels of the display area aptness is not limited.

The display area size is a size of the display area. Similar to the display image size, the display area size may be indicated by longitudinal pixel numbers and lateral pixel numbers.

The display area characteristic corresponds to above-described display image characteristic, and indicates the characteristic of the display area. In the present embodiment, the display area characteristic associated with each display area includes a visual line characteristic, an expressiveness characteristic, and an operability characteristic.

The visual line characteristic indicates whether the target user needs to move the visual line. The visual line characteristic has 5 levels of values including "1" to "5". When the user has less need to move the visual line to view the display area, the display area has a higher visual line characteristic value. For example, the display area requiring non-movement of the visual line may include a display area of the head-up display. The visual line characteristic of the display area is a characteristic with respect to the driver.

The expressiveness characteristic indicates whether expressiveness (resolution, color or the like) of the display area is high or not. The expressiveness characteristic has 5 levels of values including "1" to "5". The display area that has a higher expressiveness has a higher expressiveness characteristic value. For example, the display area having a high expressiveness may include a display area of the liquid crystal display apparatus that displays the map for the navigation or the like.

The operability characteristic indicates whether corresponding display area has a good operability. The operability characteristic has 5 levels of values including "1" to "5". The display area that has a better operability has a higher operability characteristic value. For example, the display area to which a complicated operation is able to be performed may include a display area of the liquid crystal display apparatus that is integrated with a touch panel.

In the present embodiment, display area characteristic has 5 levels of values including "1" to "5", However, the quantity of the levels of each display area characteristic is not limited. Each display area characteristic may include two or more two levels of values.

Figure 3A:
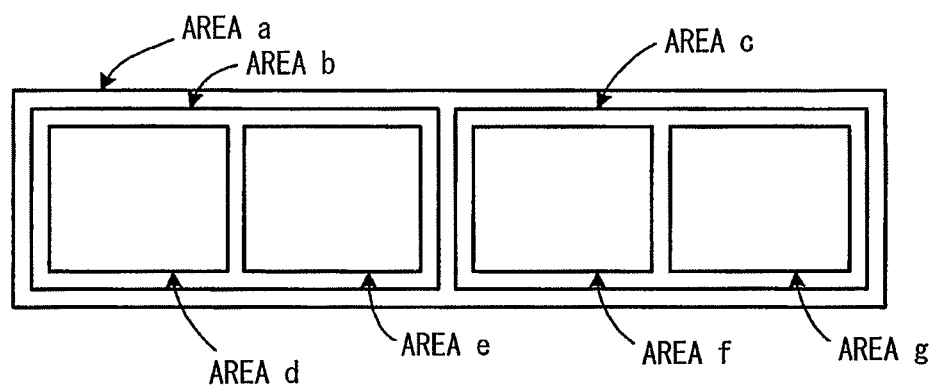
FIG. 3(a) is a diagram showing display areas.
Figure 3B:
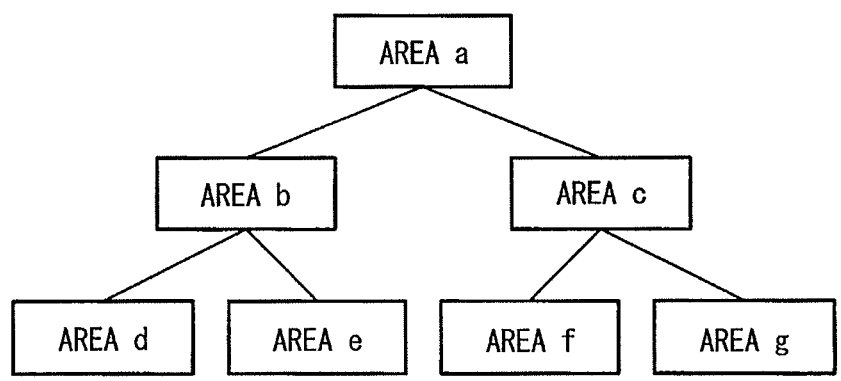
FIG. 3(b) is a diagram showing a structure of hierarchy data of the display areas stored in the display area managing section.

The display area managing section 12 manages the display areas of the display apparatus A 21 to the display apparatus C 23 based on a hierarchy data structure of the display areas. That is, the display screen of the display apparatus may be used as single display area or may be used as multiple divided display areas. The display area managing section 12 includes a storage storing the hierarchy data structure of the display areas. For example, as shown in FIG. 3(a) and FIG. 3(b), the display areas a to g are provided by the display apparatus B 22 and the display apparatus C 23. The display area managing section 12 stores an inclusive relation of each display area. The inclusive relation is referred when extracting combinations of the display areas. A display area included in another display area currently being used is excluded from assignment targets of the display images.

Figures 13A, 13B, 13C:
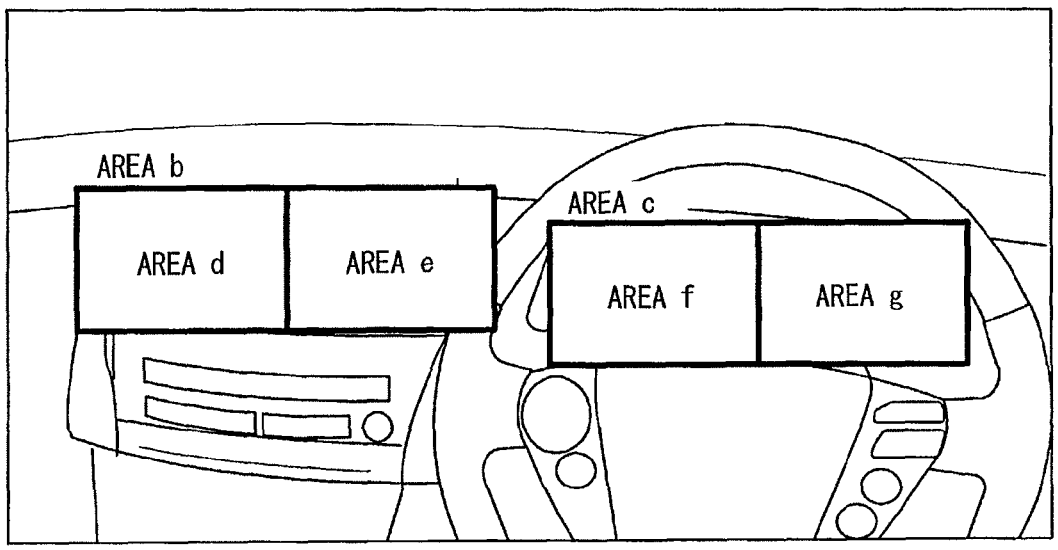
FIG. 13(a) is a diagram showing display areas used in an example of the display control process.
FIG. 13(b) is a diagram showing an aptness of each display area.
FIG. 13(c) is a diagram showing a display area combination list.

Specifically, suppose that the display apparatus B 22 is provided by the liquid crystal display disposed at a center portion of the vehicle, and the display apparatus C 23 is provided by the meter panel. In this case, as shown in FIG. 3(a) and FIG. 13(a), the display area of the display apparatus B 22 that is provided by the liquid crystal display is set as a display area b. Further, the display area b includes a display area d and a display area e, which are available by dividing the display area b in a longitudinal direction. Similarly, the display area of the display apparatus C 23 that is provided by the meter panel is set as a display area c. Further, the display area c includes a display area f and a display area g, which are available by dividing the display area c in a longitudinal direction. As shown in FIG. 3(a), the display screen of the display apparatus B 22 and the display screen of the display apparatus C 23 may be used as single display area, and in this case, the display area provided by the display screen of the display apparatus B 22 and the display screen of the display apparatus C 23 is set as a display area a. In this case, the display area a is a display area that covers the display screens of two display apparatuses. In this case, as shown in FIG. 3(b), the display area a is set as a top hierarchy display area. In a hierarchy right under the display area a, the display area b and the display area c are arranged. The display area d, the display area e, the display area f and the display area g are arranged in a hierarchy right under the display area b and the display area c.

As shown in FIG. 1, the assignment managing section 13 stores aptness tables, mandatory exclusion constraint expressions (corresponding to mandatory exclusion information), and assignment information. Each aptness table is used to calculate each aptness based on the display image characteristic and the display area characteristic. The mandatory exclusion constraint expression will be described later. The assignment information indicates that a specific display image is assigned to a specific display area.

The aptness tables include a visual line aptness table (refer to FIG. 4(a)), an expressiveness aptness table (refer to FIG. 4(b)), and an operability aptness table (refer to FIG. 4(c)). The visual line aptness table is used to calculate the visual line aptness based on the visual line characteristic of the display image and the visual line characteristic of the display area. The expressiveness aptness table is used to calculate the expressiveness aptness based on the expressiveness characteristic of the display image and the expressiveness characteristic of the display area. The operability aptness table is used to calculate the operability aptness based on the operability characteristic of the display image and the operability characteristic of the display area.

Each aptness table expresses the aptness by 10 levels of values including "1" to "10". When the aptness is higher, the value of the aptness is greater. Similar to the display area aptness, the levels of each of the visual line aptness, the expressiveness aptness, and the operability aptness is not limited to 10.

With the aptness tables, the aptness corresponding to each property is calculated based on the display image characteristic of the display image and the display area characteristic of the display area. For example, the display image indicating the "map" for the navigation includes great amount of information. Thus, the display image indicating the "map" for the navigation is deemed as a display image requiring a high expressiveness. Accordingly, the display area of the liquid crystal display apparatus having a high expressiveness is set to have an expressiveness characteristic value of "5". In this case, in the example shown in FIG. 4(b), a maximum value of the expressiveness aptness is calculated as "10". This indicates that when the display image indicating the "map" is combined with the display area of the liquid crystal display apparatus, the expressiveness aptness has the maximum value.

For example, when the display image having the expressiveness characteristic of "1", that is, the display image having small amount of information and low requirement to the expressiveness is assigned to the display area having the expressiveness characteristic of "5", it is an over performance assignment. The combinations of over performance assignments are positioned under a diagonal line from a top left to a bottom right of each table. In the present embodiment, as described later, an evaluation value is calculated with respect to each combination of the display image and the display area, and a most appropriate combination of the display image and the display area is extracted. Thus, the maximum value "10" is even assigned to the over performance assignment.

Specifically, suppose that a combination of the display image X (having expressiveness characteristic of "5") and the display area a (having expressiveness characteristic of "5") and a combination of the display image Y (having expressiveness characteristic of "1") and the display area b (having expressiveness characteristic of "1") are the most appropriate combinations. In this case, according to FIG. 4(b), the respective expressiveness aptness of the two combinations are both "10", and a sum of the expressiveness aptness of the two combinations is "20".

Regarding a combination of the display image Y (having expressiveness characteristic of "1") and the display area a (having expressiveness characteristic of "5") and a combination of the display image X (having expressiveness characteristic of "5") and the display area b (having expressiveness characteristic of "1"), the former is over performance combination and has an expressiveness aptness of "10" and the latter has an expressiveness aptness of "2" (refer to FIG. 4(b)). Thus, a sum of the expressiveness aptness of the two combinations is "12".

That is, in the present embodiment, an evaluation value is calculated with respect to each combination of the display image and the display area. Thus, even when the over performance combination is assigned to the maximum value "10", a selection of an inappropriate combination is avoided and a purpose is accomplished.

The mandatory exclusion constraint expressions are predetermined constraint expressions that control, for example, a necessary display image to be surely displayed on one of the display areas, or display images indicating repeated contents not to be displayed concurrently on multiple display areas.

The mandatory exclusion constraint expression in the present embodiment is defined by 5 operators including "&", "|", "^", "/" and "+". The truth table of each operator is shown in FIG. 5(a). That is, when the display image A and the display image B are in active state, each operator indicates a meaning as shown in FIG. 5(b).

A & B indicates a display of both A and B. This operator corresponds to an operator indicating a logical conjunction in mathematical logic. That is, as shown in FIG. 5(b), A & B indicates a condition that both A and B are necessarily included. When A, B, C are active, the display image combination list includes two display image combinations of "A, B" and "A, B, C". At this time, each display image combination included in the display image combination list is a display image combination based on the mandatory exclusion constraint expression, and will be described later in detail.

A|B indicates a display of at least one of A or B. This operator corresponds to an operator indicating a logical disjunction in mathematical logic. That is, as shown in FIG. 5(b), A|B indicates a condition that one of A, B, or AB is necessarily included. When A, B, C are active, the display image combination list includes six combinations of "A", "B", "A, B", "A, C", "B, C", and "A, B, C".

A^B indicates a display of one of A and B. This operator corresponds to an operator indicating a logical exclusive disjunction in mathematical logic. That is, as shown in FIG. 5(b), A^B indicates a condition that A is necessarily included without B or B is necessarily included without A. When A, B, C active, the display image combination list includes four combinations of "A", "B", "A, C", and "B, C".

A/B indicates a display of one of A and B, or neither A nor B. This operator corresponds to an operator indicating a logical alternative denial in mathematical logic. That is, as shown in FIG. 5(b), A/B indicates a condition that A is necessarily included without B or B is necessarily included without A, or neither A nor B is included. When A, B, C are active, the display image combination list includes five combinations of "A", "B", "A, C", "B, C", and "C".

A+B indicates a display of both A and B, or neither A nor B. This operator corresponds to an operator indicating an equal value (a logical inverse of the exclusive disjunction) in mathematical logic. That is, as shown in FIG. 5(b), A+B indicates a condition that both A and B are necessarily included, or neither A nor B is included. When A, B, C are active, the display image combination list includes three combinations of "A, B", "A, B, C", and "C".

A/B is logical negation of A & B, and A+B is logical negation of A^B. In the present embodiment, a processing of the operators is performed in the display control process that will be described later. In order to simplify the process, the above described operators, such as "/" and "+", are defined.

The assignment information defining an assignment of a specific display image to a specific display area indicates a correspondence relation between a predetermined specific display area and a predetermined specific display image. That is, in the present embodiment, the display images are assigned to the display areas with reference to the assignment information, and options of the combination of the display image and the display area are figured out. The assignment information is shown in FIG. 11(c) as an example. In FIG. 11(c), at an upper column, the display image X is assigned to the display area a or the display area b. At a middle column, the display image Z is assigned to the display area a or the display area c. At a lower column, the display image W is assigned to the display area b or the display area d. FIG. 11(a), FIG. 11(b), and FIG. 11(d) will be described later.

In the present embodiment, the display image assignment control section 14 generates combination list indicating the combination options of the display images and the display areas based on the information stored in the display image managing section 11, the information stored in the display area managing section 12, and the information stored in the assignment managing section 13. The display image assignment control section 14 calculates evaluation value with respect to each option included in the combination list, and selects one of the options having a maximum evaluation value by comparing the evaluation values of the options. With this configuration, the display image assignment control section 14 determines an assignment of the display image to the display area. The display layout control section 15 displays the display image to the display area based on the determined assignment combination of the display image.

Figure 7:
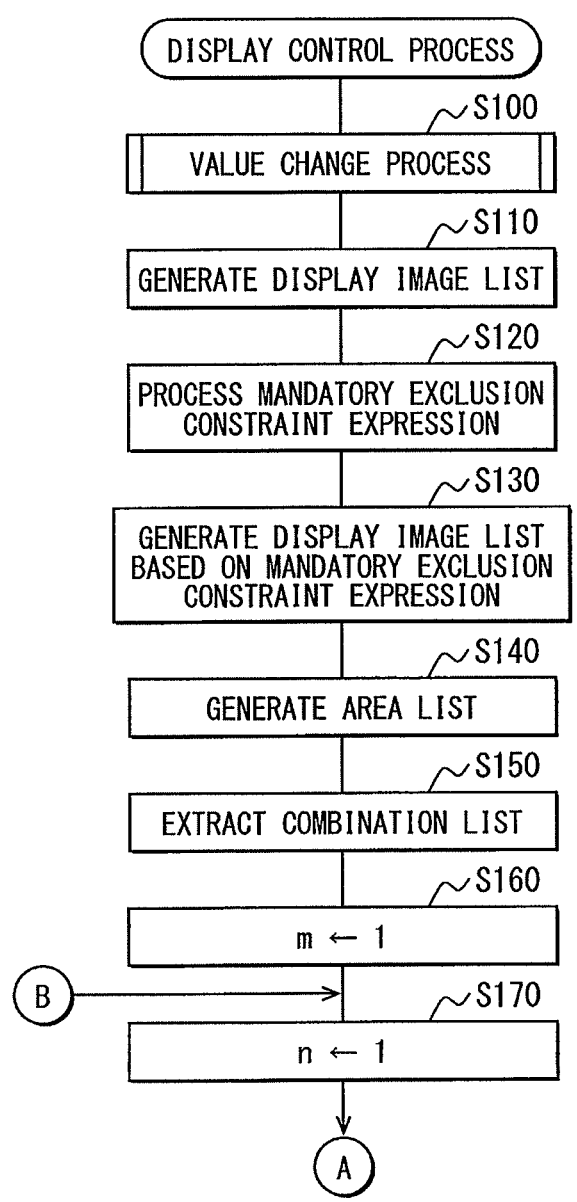
FIG. 7 is a flowchart showing a first half of a display control process.
Figure 8:
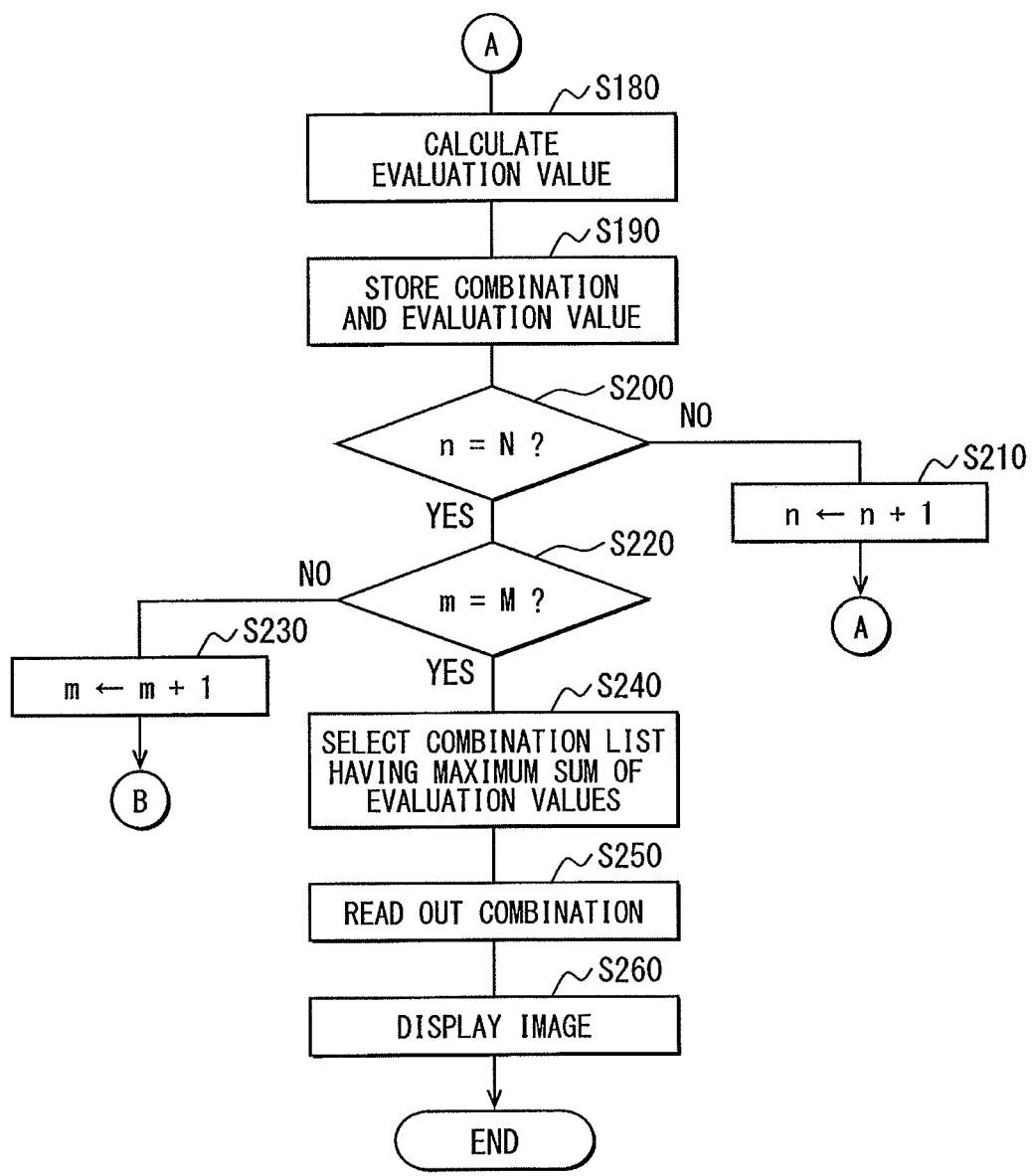
FIG. 8 is a flowchart showing a second half of the display control process.

The following will describe the display control process executed by the control unit 10. FIG. 7 is a flowchart showing a first half of the display control process, and FIG. 8 is a flowchart showing a second half of the display control process. Hereinafter, the display image value and the display area aptness are collectively referred to as "value", and display image size and the display area size are collectively referred to as "size".

At S100, a value change process is executed. At this process, the display image value of the display image and the display area aptness of the display area are changed corresponding to the vehicle state. In the present embodiment, the vehicle state includes a traveling state and a parking state.

In the present embodiment, the value change process is executed a part of the display control process. However, the value change process is not requested to be executed mandatorily. As another example, an execution of the value change process may be omitted. As another example, the value change process may be executed only when a predetermined condition is satisfied.

At S110, the display image list is generated based on the display target to be displayed. Specifically, when the display state included in the properties of the display image is "active state", the display image is extracted and sorted together with other extracted display images. For example, among display images X, Y, Z, W, when the display images X, Z, W are in the "active state", the display image list includes the display images "X, Z, W".

At S120, the mandatory exclusion constraint expression is processed. The mandatory exclusion constraint expression may include a display image whose display state is "inactive state". Thus, it is difficult to apply the mandatory exclusion constraint expression directly to the display images included in the display image list. Thus, in the present embodiment, the mandatory exclusion constraint expression including the display image whose display state is "inactive state" is processed in order to equivalently convert the mandatory exclusion constraint expression into a simplified mandatory exclusion constraint expression.

Figure 6A:
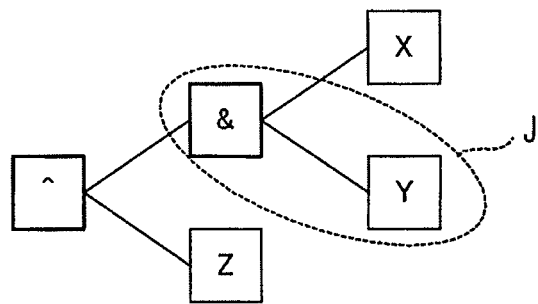
FIG. 6(a), FIG. 6(b), and FIG. 6(c) are diagrams showing processing of mandatory exclusion constraint expressions.
Figure 6B:
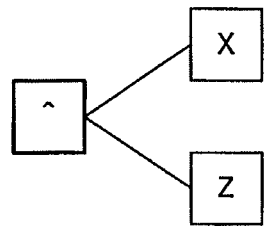

Specifically, as shown in FIG. 6(a), a syntax tree is generated from the mandatory exclusion constraint expression. In FIG. 6(a), a syntax tree of a mandatory exclusion constraint expression of "(X & Y)^Z" is shown as an example. In this case, suppose that the display images X and Z are in the "active state", and the display image Y is in the "inactive state". Then, the display image Y is deleted from the syntax tree and the related operator "&" at the higher hierarchy is deleted from the syntax tree as shown by a dashed line J. With this deletion, the syntax tree becomes as shown in FIG. 6(b), and the mandatory exclusion constraint expression becomes "X^Z". As described above, deleting the display image in "inactive state" and the related operator at the higher hierarchy of the deleted display image is applied in a case where the related operator at the higher hierarchy is "&", "|", or "^".

Figure 6C:
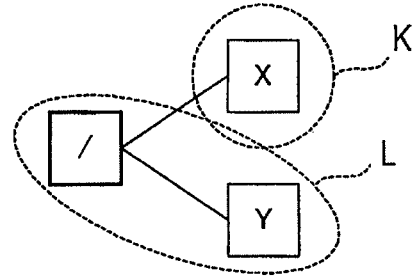

When the related operator at the higher hierarchy is "/", as shown by a dashed line L in FIG. 6(c), the "inactive" display image Y and the related operator "/" at the higher hierarchy are deleted, and as shown by a dashed line K, the display image X at the lower hierarchy of the operator "/" related to the deleted "inactive" display image Y is also deleted. It is similar to a case where the related operator at the higher hierarchy is "+". In the present embodiment, in order to obtain an expected result, the operators "/" and "+" are used when processing the mandatory exclusion constraint expression.

At S130, the display image combination list is generated based on the mandatory exclusion constraint expression simplified at S120. For example, as shown in FIG. 6(b), when the mandatory exclusion constraint expression is "X^Z" and the display image list generated at S110 is "X, Z, W", since a constraint condition that indicates one of X and Z should be included is applied to the display images X and Z included in the display image list, the newly generated display image combination list includes two display image combinations of "X, W" and "Z, W" (refer to FIG. 11(b)). Herein, one of the X and Z is required to be displayed necessarily. That is, one of the X and Z is a necessary display image. In this case, a mandatory display requirement flag is set with respect to each of the display images X and Z, which are required to be necessarily displayed based on the mandatory exclusion constraint expression.

With the process executed at S130, the display image combination list including multiple display image combinations is generated based on the display image list including multiple display images that are in active state. As described above with reference to FIG. 5(b), the display image combinations are extracted corresponding to each operator.

Figure 9A:
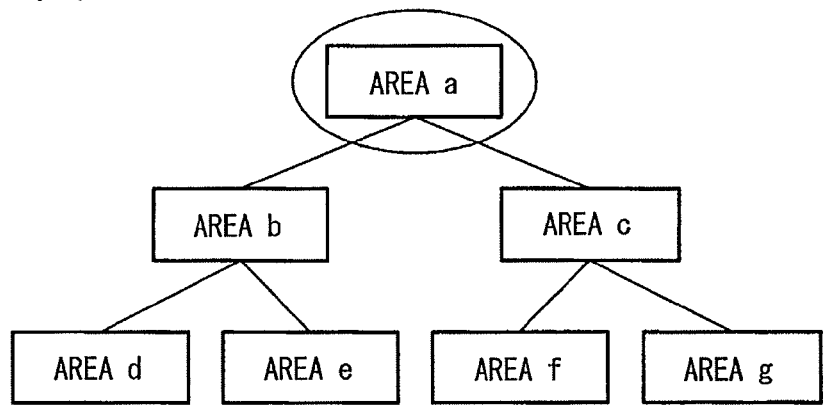
FIG. 9(a), FIG. 9(b), and FIG. 9(c) are diagrams showing a generation of a display area combination list in detail.
Figure 9B:
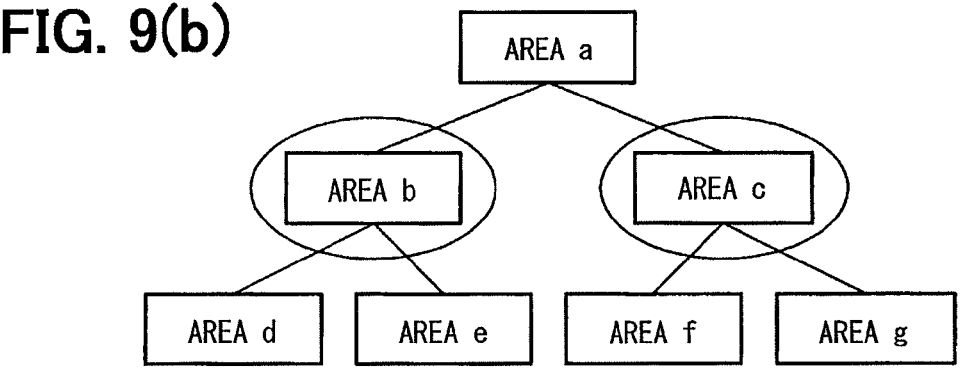
Figure 9C:
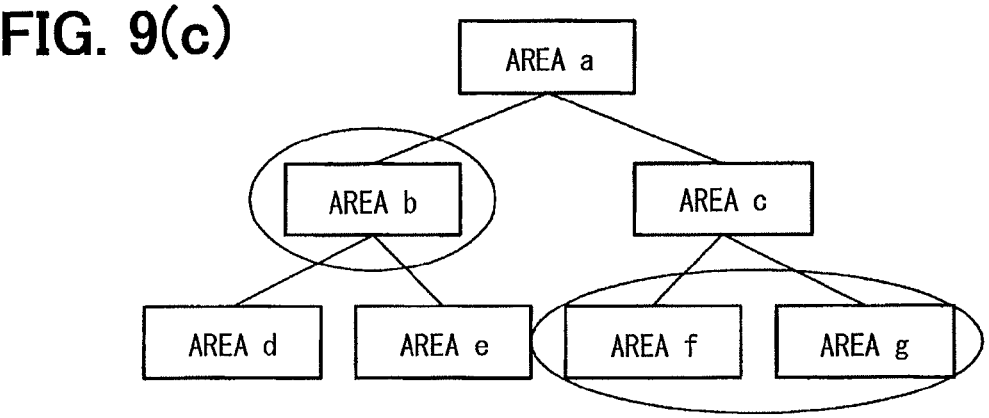
Figure 10A:
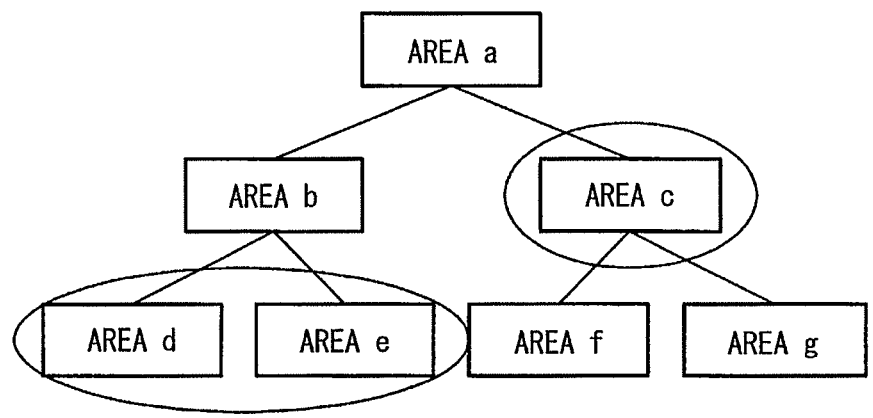
FIG. 10(a) and FIG. 10(b) are diagrams showing a generation of a display area combination list in detail.
Figure 10B:
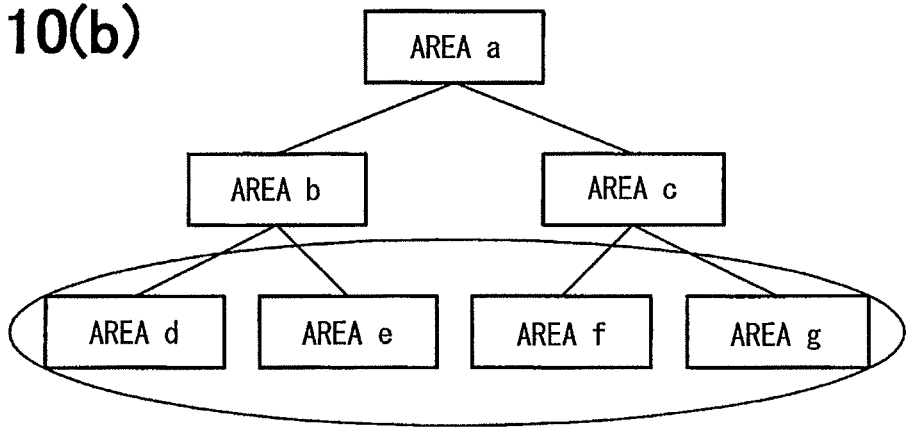

At S140, the display area combination list is generated. The display area combination list includes at least one available display area combination. The display area combination includes at least one available display area. As described above, the display area managing section 12 stores the hierarchy data structure of the display areas of the display apparatus A 21, the display apparatus B 22 and the display apparatus C 23. The available display area combinations are generated as the display area combination list based on the hierarchy data structure. For example, when the hierarchy data structure indicates a hierarchy data structure shown in FIG. 3(b), the display area a is extracted as one display area combination as shown in FIG. 9(a). When the display area a is being used, other display areas b to g cannot be used. Further, as shown in FIG. 9(b), the display area combination including two display areas b and c is extracted. Similarly, as shown in FIG. 9(c), the display area combination including three display areas b, f, g is extracted. Further, as shown in FIG. 10(a), the display area combination including three display areas c, d, e is extracted. Further, as shown in FIG. 10(b), the display area combination including four display areas d, e, f, g is extracted. That is, based on the hierarchy data structure shown in FIG. 3(b), five display area combinations "a", "b, c", "b, f, g", "c, d, e" and "d, e, f, g" are extracted as shown in FIG. 11(a). In this case, the display area combination list includes five display area combinations.

At S150, the assignment combination list is extracted. In this process, assignment combination options are extracted as the assignment combination list from all available assignment combinations of each display image combination and each display area combination. As described above, at S130, the display image combination list satisfying the mandatory exclusion constraint expression is generated (refer to FIG. 11(b)). At S140, the display area combination list is generated (refer to FIG. 11(a)). One display area combination of the display area combination list and one display image combination of the display image combination list are extracted, and the assignment combination list is extracted, based on the assignment information, the size, and the mandatory display requirement flag.

At First, the display area combination of "display area a" shown in FIG. 11(a) is read out, and the display image combination of "X, W" shown in FIG. 11(b) is read out. At this time, the assignment information indicates that the display image X is assigned to the display area a or the display area b as shown in FIG. 11(c). Accordingly, the assignment combination of "X-a" is established. When the display image combination is "X, W" and the display area combination includes the display area a, the assignment combination is "X-a" since the display area combination includes only one display area a. At this time, the display image combination includes the display image X that is required to be mandatorily displayed. Thus, a first assignment combination option of the assignment combination list is "X-a" (refer to FIG. 11(d)).

Then, the display area combination of "display area a" shown in FIG. 11(a) is read out, and the display image combination of "Z, W" shown in FIG. 11(b) is read out. At this time, the assignment information indicates that the display image Z is assigned to the display area a or the display area c as shown in FIG. 11(c). Accordingly, the assignment combination of "X-a" is established. When the display image combination is "Z, W" and the display area combination includes the display area a, the assignment combination is "Z-a" since the display area combination includes only one display area a. At this time, the display image combination includes the display image Z that is required to be mandatorily displayed. Thus, a second assignment combination option of the assignment combination list is "Z-a" (refer to FIG. 11(d)).

Then, the display area combination of "display areas b, c" shown in FIG. 11(a) is read out, and the display image combination of "X, W" shown in FIG. 11(b) is read out. At this time, the assignment information indicates that the display image X is assigned to the display area a or the display area b as shown in FIG. 11(c). Accordingly, the assignment combination of "X-b" is established. Subsequently, an assignment of the display image W of the display image combination to the display area c is considered. However, the assignment information indicates that the display image W is required to be assigned to the display area b or d. Thus, the assignment combination of "W-c" is not established, and only the assignment combination of "X-b" is established. At this time, the display image combination includes the display image X that is required to be mandatorily displayed. Thus, a third assignment combination option of the assignment combination list is "X-b" (refer to FIG. 11(d)).

Then, the display area combination of "display areas b, c" shown in FIG. 11(a) is read out, and the display image combination of "Z, W" shown in FIG. 11(b) is read out. At this time, the assignment information indicates that the display image Z is assigned to the display area a or the display area c as shown in FIG. 11(c). Accordingly, the assignment combination of "Z-c" is established. Subsequently, an assignment of the display image W of the display image combination to the display area b is considered. However, the assignment information indicates that the display image W is required to be assigned to the display area b or d. Accordingly, the assignment combination of "W-b" is established. That is, the assignment combination is "Z-c, W-b". At this time, the display image combination includes the display image Z that is required to be mandatorily displayed. Thus, a fourth assignment combination option of the assignment combination list is "Z-c, W-b" (refer to FIG. 11(d)).

Similarly, one display area combination is read out from the display area combination list at one time, and the display area combination, which is effective when combined with the display image combination of the display image combination list, is extracted. At this time, the assignment information is applied to the assignment of the display image to the display area. A combination of the display image and the display area, which is not limited by the assignment information, is excluded. The display areas may include a display area to which one of the display images cannot be assigned caused by the display image size and the display area size, and this kind of display area is excluded.

An extracting order of the assignment combination list at S150 is schematically shown in FIG. 29, FIG. 30, FIG. 31, FIG. 32, FIG. 33, and FIG. 34. Herein, Step1 corresponds to a generation of the display area combination list (S140 in FIG. 7). Step2 corresponds to a generation of the display image list "Active Image" (S110), a processing of the mandatory exclusion constraint expression (S120), and a generation of the display image combination list "Image" based on the mandatory exclusion constraint expression (S130). In FIG. 29 to FIG. 34, one display area of each display area combination of the display area combination list "Area" is read out one time. From the assignment combinations, each of which is a combination of one display area of each display area combination of the display area combination list "Area" and each display image combination of the display image combination list "Image", one or more assignment combination satisfying the assignment information "Area-Image assignment" and the mandatory exclusion constraint expression "I^II" is extracted. In the drawings, "AND" indicates that the display areas satisfying the assignment information are extracted.

The assignment combination list shown in FIG. 11(d) is generated by the process executed at S150. The following will describe under a condition that a quantity of the generated assignment combination options is equal to M.

At S160, a variable m indicating the quantity of the assignment combination options of the assignment combination list is initialized as "1". Every when the variable m is incremented, in the assignment combination list, one assignment combination option is processed in an order of the first assignment combination option, the second assignment combination option, the third assignment combination option and so on.

At S170, a variable n indicating each assignment in each assignment combination option is initialized as "1". The following will describe under a condition that, in one assignment combination option, a quantity of the assignments is equal to N. Every when the variable n is incremented, in the m-th assignment combination option, one assignment is processed in an order of the first assignment, the second assignment, the third assignment and so on.

At S180 in FIG. 8, an evaluation value is calculated. In this process, an evaluation value of the n-th assignment in the m-th assignment combination option is calculated.

Specifically, in the present embodiment, the evaluation value is calculated based on a target user evaluation value and a characteristic evaluation value.

The target user evaluation value includes a driver evaluation value (DE), a front seat passenger evaluation value (AE), and a rear seat passenger evaluation value (RE). The characteristic evaluation value includes a driver characteristic evaluation value (DCE), a front seat passenger characteristic evaluation value (ACE), and a rear seat passenger characteristic evaluation value (RCE), and each characteristic evaluation value is calculated based on the following expressions. In order to simplify the expressions, the driver is represented by "D", the front seat passenger is represented by "A", and the rear seat passenger is represented by "R".

$$DE = K[D] \times \text{display image value } [D] \times \text{display area aptness } [D]$$

$$AE = K[A] \times \text{display image value } [A] \times \text{display area aptness } [A]$$

$$RE = K[R] \times \text{display image value } [R] \times \text{display area aptness } [R]$$

$$DCE=(K1\times\text{visual line aptness}+K2\times\text{expressiveness aptness}+K3\times\text{operability aptness})\div(K1+K2+K3)$$

$$ACE=(K4\times\text{expressiveness aptness}+K5\times\text{operability aptness})\div(K4+K5)$$

$$RCE=(K6\times\text{expressiveness aptness}+K7\times\text{operability aptness}(K6+K7)$$

Herein, K [D], K [A], K [R] indicate existence of the driver, the front seat passenger, and the rear seat passenger, respectively. When on board, K has a value of "1", and when not on board, K has a value of "0". K1 to K7 are weighting coefficients.

The visual line aptness is a characteristic with respect to only the driver. Thus, in calculations of the ACE and the RCE, the visual line aptness is not considered. A calculation of the evaluation value is indicated as below.

$$\text{Evaluation value}=DE\times DCE+AE\times ACE+RE\times RCE$$

At S190, the assignment of the display image to the display area, to which the evaluation value is calculated at S180, and the evaluation value of the assignment are stored.

At S200, whether the variable n is equal to the quantity N of the assignments is determined. This process is executed for determining whether all assignments included in the m-th assignment combination option are processed or not. When n=N (S200: YES), it proceeds to S220. On the other hand, when n≠N (S200: NO), that is, some of the assignments has not been processed yet, the variable n is incremented at S210, and processes from S180 are repeatedly executed.

At S220, whether the variable m is equal to the quantity M of the assignment combination options of the assignment combination list is determined. This process is executed for determining whether all assignment combination options are processed or not. When m=M (S220: YES), it proceeds to S240. On the other hand, when m≠M (S220: NO), that is, some of the assignment combination options has not been processed yet, the variable m is incremented at S230, and processes from S170 in FIG. 7 are repeatedly executed.

At S240, based on a sum of the evaluation values of assignments included in each assignment combination option, an assignment combination option having a maximum sum of the evaluation values is selected.

At S250, the assignment combinations of the display image and the display area, which are included in the assignment combination option selected at S240, are read out. Hereinafter, the assignment combination option is simply referred to as an option.

The processes executed at S110 to S250 function as the display image assignment control section 14.

At S260, the display image is displayed. At this process, the display image is displayed to a corresponding display area decided by the assignment combination of the display image and the display area, and this process functions as the display layout control section 15.

Figure 12:
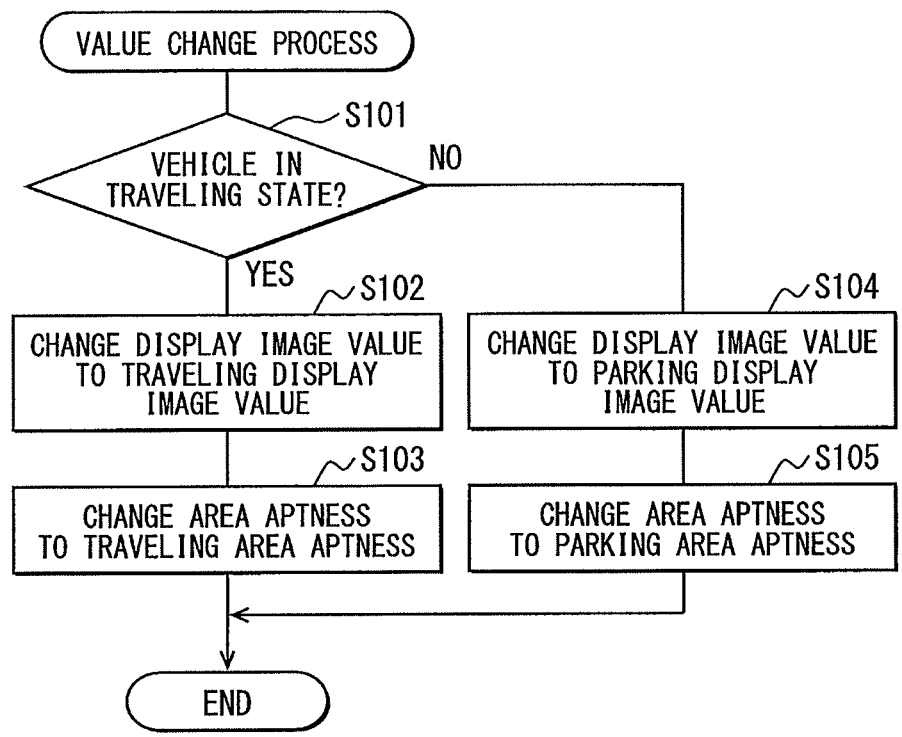
FIG. 12 is a flowchart showing a value change process.

The following will describe the value change process executed at S100 of FIG. 7. FIG. 12 shows a flowchart of the value change process.

At S101, the vehicle is determined whether in the traveling state or not. This determination is performed based on, for example, the "vehicle speed" transmitted from the vehicle speed ECU 42. When the vehicle is determined to be in the traveling state (S101: YES), the display image managing section 11 changes the display image value of the display image to a traveling display image value at S102, and the display area managing section 12 changes the display area aptness of the display area to a traveling display area aptness at S103, and ends the value change process. When the vehicle is determined to be not in the traveling state (S101: NO), that is, the vehicle is in the parking state, the display image managing section 11 changes the display image value of the display image to a parking display image value at S104, and the display area managing section 12 changes the display area aptness of the display area to a parking display area aptness at S5, and ends the value change process.

The display image value of the display image in the traveling state/parking state is a predetermined value, and the display area aptness of the display area in the traveling state/parking state is a predetermined value. For example, the display image value of the display image acquired from the multimedia ECU 41 may decrease during the traveling state compared with the parking state with consideration of a safety aspect. With respect to this kind of display image, the display image value during the traveling state is set lower than the display image value during the parking state. During the traveling state, the aptness of the display area that does not require too much movement of visual line may increase. Thus, with respect to this kind of display area, the display area aptness during the traveling state is set greater than the display area aptness during the parking state.

The following will describe an example in order to facilitate understanding of the display control process. Particularly, an assignment of the display image to the display area by calculating the evaluation values will be described when various mandatory exclusion constraint expressions are set.

The following will describe a case in which the display apparatus B 22 is provided by the liquid crystal display disposed at the center portion of the vehicle, and the display apparatus C 23 is provided by the meter panel. Further, as shown in FIG. 13(a), the display apparatus B 22 includes the display area b, the display area d and the display area e generated by dividing the display area b in the longitudinal direction. The display apparatus C 23 includes the display area c, the display area f and the display area g generated by dividing the display area c in the longitudinal direction. Further, as shown in FIG. 5(b), the display area b and the display area c may be used together as single display area a. However, in the following description, an assignment of the display image to the display area a is not considered.

The display area aptness for each display area is set as shown in FIG. 13(b). The display area aptness is a parameter with respect to the driver. In order to simplify the description, the display area aptness with respect to the front seat passenger and rear seat passenger are not considered. Specifically, the display area aptness of the display area b is "50", and the display area aptness of the display area c is "100". The display area aptness of the display area d is "20", the display area aptness of the display area e is "30", the display area aptness of the display area f is "90", and the display area aptness of the display area g is "80". The display area combination list in this case is shown in FIG. 13(c).

Figures 14A, 14B:
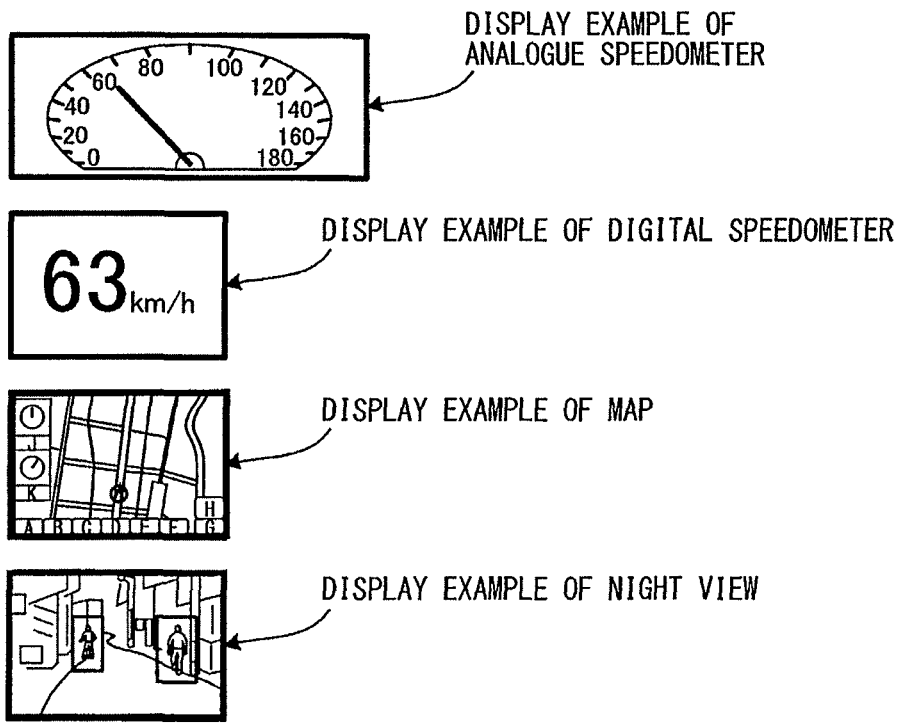
FIG. 14(a) is a diagram showing display images and display image values used in an example of the display control process.
FIG. 14(b) is a diagram showing display examples of respective display images.

The display images to be displayed on the display areas b to g are shown in FIG. 14(a) and FIG. 14(b). As shown in FIG. 14(a), the display images include the "analogue speedometer" (hereinafter referred to as "ANAL") indicating the vehicle speed, "digital speedometer" (hereinafter referred to as "DIGI") indicating the vehicle speed, the "map" for the navigation, and the "night view" indicating a moving object, such as a pedestrian, detected during hours of darkness.

As shown in FIG. 14(a), the display image value of the "ANAL" is "70", and the display image value of the "DIGI" is "50". The display image value of the "map" is "20", and the display image value of the "night view" is "100". Similar to the display area aptness, the display image values are parameters with respect to the driver. In order to simplify the description, the display image values with respect to the front seat passenger and rear seat passenger are not considered.

FIG. 14(*b*) shows display examples of the display images. The top drawing is the display example of "ANAL", a second drawing is the display example of "DIGI", a third drawing is the display example of "map", and a fourth drawing is the display example of "night view". Regarding the "ANAL", a width of the display image size in the lateral direction is greater than a width of the display image size of other display image.

FIG. 15 shows the assignment information indicating an assignment of a display image to a display area. As described above, the assignment information indicates a correspondence relation between a specific display area and a specific display image, and is stored in the assignment managing section 13. In FIG. 15, the display image "ANAL" is assigned to the display area c, and the display image "DIGI" is assigned to the display area d or f. Further, the "map" is assigned to the display area b, d or e, and the "night view" is assigned to the display area e or g.

Under above-described configuration, further suppose that a mandatory exclusion constraint expression is set between the display images "ANAL" and "DIGI". Both the display image "ANAL" and the display image "DIGI" show the vehicle speed. However, a combination of the two display images may be different corresponding to an operation performed by the user or a class or type of the vehicle. For example, a combination condition, such as necessarily displaying one of the two or displaying both concurrently, may be set different in a popular car from a luxury car. The combination condition may also be set differently based on a display setting performed by the user. In the following mandatory exclusion constraint expression, "ANAL" is simplified as "A", and "DIGI" is simplified as "D".

(a) Case A^D ("Night View" is in Inactive State)

In this example, an operator indicating the logical exclusive disjunction is applied between the "DIGI" and the "ANAL". As shown in FIG. 16(*a*), the "ANAL", the "DIGI", and the "map" are in active state, and the "night view" is in inactive state.

At this time, the display image list is generated based on the display images in the active state (S110 in FIG. 7). Thus, the display image list of "ANAL, DIGI, map" is generated.

Then, the processing of the mandatory exclusion constraint expression is performed (S120 in FIG. 7). Since the mandatory exclusion constraint expression of "A^D" does not include the display image in the inactive state, the mandatory exclusion constraint expression after processing is also "A^D".

Then, based on the mandatory exclusion constraint expression, the display image combination list is generated (S130 in FIG. 7). Since one of the "ANAL" and "DIGI" is required to be necessarily displayed, as shown in FIG. 16(*b*), the display image combination list including four display image combinations of "ANAL", "DIGI", "ANAL, map", and "DIGI, map" is generated.

Then, the display area combination list is generated (S140 in FIG. 7). Since the display area a is excluded as described above, as shown in FIG. 13(*c*), the display area combination list includes four display area combinations of "b, c", "b, f, g", "c, d, e", and "d, e, f, g". Refer to FIG. 9, FIG. 10, and FIG. 11(*a*) with together.

Then, the assignment combination list is extracted (S150 in FIG. 7). An extraction method of the assignment combination list has been described with reference to FIG. 11(*a*) to FIG. 11(*d*).

Although it becomes a repetition, at first, the "display areas b, c" is read out from the display area combination list shown in FIG. 13(*c*), and the display image combination "ANAL" is read out from the display image combination list shown in FIG. 16(*b*). At this time, the assignment information shown in FIG. 15 indicates that the "ANAL" is assigned to the display area c. Thus, the assignment combination of "ANAL-c" is established. At this time, since the "ANAL" that is required to be necessarily displayed is included, the option (1) of the assignment combination list is "ANA-c" (refer to FIG. 17(*a*)).

Then, the display area combination of "b, c" is read out, and the display image combination "DIGI" shown in FIG. 16(*b*) is read out. At this time, the assignment information shown in FIG. 15 indicates that the "DIGI" is assigned to the display area d or f. Thus, the assignment combination is not established.

Similarly, the display area combination of "b, c" is read out, and the display image combination of "ANAL, map" shown in FIG. 16(*b*) is read out. At this time, the assignment information shown in FIG. 15 indicates that the "ANAL" is assigned to the display area c. Thus, assignment combination of "ANAL-c" is established. Further, the assignment information shown in FIG. 15 indicates that the "map" is assigned to the display area b, d or e. Thus, the assignment combination of "map-b" is established. At this time, since the "ANAL" that is required to be necessarily displayed is included, the option (2) of the assignment combination list is "map-b, ANAL-c" (refer to FIG. 17(*a*)).

As described above, one display area combination is read out from the display area combination list. With respect to the readout display area combination, each display image combination of the display image combination list is assigned to the readout display area combination based on the assignment information. Then, available assignment combinations are extracted as the options of the assignment combination list. This extraction is performed to each of the display area combinations. As a result, as shown in FIG. 17(*a*), the assignment combination list is extracted. The assignment combination list includes 10 options including "ANAL-c", "map-b, ANAL-c", "DIGI-f", "map-b, DIGI-f", "DIGI-d", "ANAL-c, map-d", "ANAL-c, map-e", "DIGI-d, map-e", "map-d, DIGI-f", and "map-e, DIGI-f".

Then, with respect to each assignment included in each option, the evaluation value is calculated (S180 in FIG. 8). Then, with respect to each option, a sum of the evaluation values of all of the assignments is calculated, and the option having the maximum sum of the evaluation values is selected (S240).

For the option (1) "ANAL-c", the sum of the evaluation values of is equal to 7000. Specifically, the sum of the evaluation value is equal to a product of the display image value "70" of the "ANAL" (refer to FIG. 14(*a*)) and the display area aptness "100" of the display area c (refer to 13(*b*)), that is, 70×100=7000. Among the target user evaluation values, only the driver evaluation value (DE) is calculated, and the characteristic evaluation value is not considered.

As shown in FIG. 17(*a*), the evaluation value is calculated with respect to each option as the following.

| | |
|---|---|
| 20×50+70×100=8000 | Option (2): |
| 50×90=4500 | Option (3): |
| 20×50+50×90=5500 | Option (4): |
| 50×20=1000 | Option (5): |
| 70×100+20×20=7400 | Option (6): |

| | |
|---|---|
| 70×100+20×30=7600 | Option (7): |
| 50×20+20×30=1600 | Option (8): |
| 20×20+50×90=4900 | Option (9): |
| 20×30+50×90=5100 | Option (10): |

Thus, in this case, the option (2) having a sum of the evaluation values equal to "8000" is selected.

With reference to the assignment combination of the selected option (2), the assignment of the display image to the display area is determined (S250 in FIG. 8), and the display images are displayed (S260).

Figures 17A, 17B:
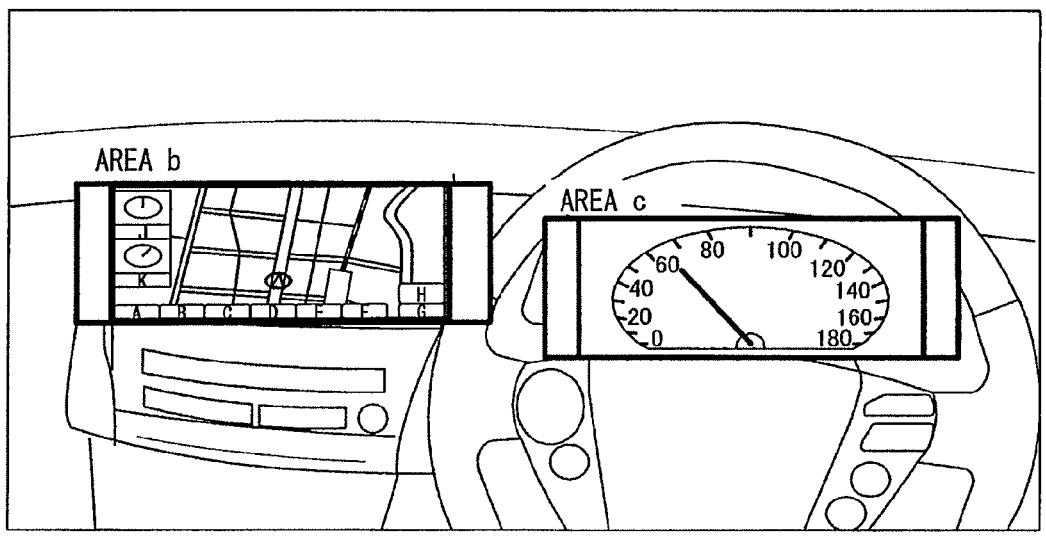
FIG. 17(a) is a diagram showing an assignment combination list.
FIG. 17(b) is a diagram showing a display assignment result of display images.

As a result, as shown in FIG. 17(b), the "map" is displayed on the display area b, and the "ANAL" is displayed on the display area c.

(b) Case A^D ("Night View" is in Active State)

Similar to the above (a), in this example, an operator indicating the logical exclusive disjunction is applied between the "DIGI" and the "ANAL". The difference from the above-described (a) is that, as shown in FIG. 18(a), the "night view" is in the active state in addition to the "ANAL", the "DIGI", and the "map"

At this time, the display image list is generated based on the display images in the active state (S110 in FIG. 7). Thus, the display image list of "ANAL, DIGI, map, night view" is generated.

Then, the processing of the mandatory exclusion constraint expression is performed (S120 in FIG. 7). Since the mandatory exclusion constraint expression of "A^D" does not include the display image in the inactive state, the mandatory exclusion constraint expression after processing is also "A^D".

Then, based on the mandatory exclusion constraint expression, the display image combination list is generated (S130 in FIG. 7). Since one of the "ANAL" and "DIGI" is required to be necessarily displayed, as shown in FIG. 18(b), the display image combination list including eight display image combinations of "ANAL", "DIGI", "ANAL, map", "DIGI, map", "ANAL, night view", "DIGI, night view", "ANAL, map, night view", and "DIGI, map, night view" is generated.

Then, the display area combination list is generated (S140 in FIG. 7). As shown in FIG. 13(c), the display area combination list includes four display area combinations of "b, c", "b, f, g", "c, d, e", and "d, e, f, g".

Then, the assignment combination list is extracted (S150 in FIG. 7). Similar to the extraction method of the assignment combination list as described above, one display area combination is read out from the display area combination list. With respect to the readout display area combination, each display image combination of the display image combination list is assigned to the readout display area combination based on the assignment information. Then, available assignment combinations are extracted as the options of the assignment combination list. This extraction is performed to each of the display area combinations included in the display area combination list.

As a result, as shown in FIG. 19, the assignment combination list is extracted. The assignment combination list includes 21 options including "ANAL-c", "map-b, ANAL-c", "DIGI-f", "map-b, DIGI-f", "DIGI-f, night view-g", "map b, DIGI-f, night view-g", "DIGI-d", "ANAL-c, map-d", "ANAL-c, map-e", "DIGI-d, map-e", "ANAL-c, night view-e", "DIGI-d, night view-e", "ANAL-c, map-d, night view-e", "DIGI-d, night view-g", "DIGI-d, map-e, night view-g", "map-d, DIGI-f", "map-e, DIGI-f", "night view-e, DIGI-f", "map-d, night view-e, DIGI-f", "map-d, DIGI-f, night view-g", and "map-e, DIGI-f, night view-g".

Then, with respect to each assignment included in each option, the evaluation value is calculated (S180 in FIG. 8). Then, in each option, a sum of the evaluation values of the assignments is calculated, and the option having the maximum sum of the evaluation values is selected (S240).

As shown in FIG. 19, the evaluation value is calculated with respect to each option as the following.

| | |
|---|---|
| 70×100=7000 | Option (1): |
| 20×50+70×100=8000 | Option (2): |
| 50×90=4500 | Option (3): |
| 20×50+50×90=5500 | Option (4): |
| 50×90+100×80=12500 | Option (5): |
| 20×50+50×90+100×80=13500 | Option (6): |
| 50×20=1000 | Option (7): |
| 70×100+20×20=7400 | Option (8): |
| 70×100+20×30=7600 | Option (9): |
| 50×20+20×30=1600 | Option (10): |
| 70×100+100×30=10000 | Option (11): |
| 50×20+100×30=4000 | Option (12): |
| 70×100+20×20+100×30=10400 | Option (13): |
| 50×20+100×80=9000 | Option (14): |
| 50×20+20×30+100×80=9600 | Option (15): |
| 20×20+50×90=4900 | Option (16): |
| 20×30+50×90=5100 | Option (17): |
| 100×30+50×90=7500 | Option (18): |
| 20×20+100×30+50×90=7900 | Option (19): |
| 20×20+50×90+100×80=12900 | Option (20): |
| 20×30+50×90+100×80=13100 | Option (21): |

Thus, in this case, the option (6) having a sum of the evaluation values equal to "13500" is selected.

With reference to the assignment combination of the selected option (6), the assignment of the display image to the display area is determined (S250 in FIG. 8), and the display images are displayed (S260).

Figure 20:
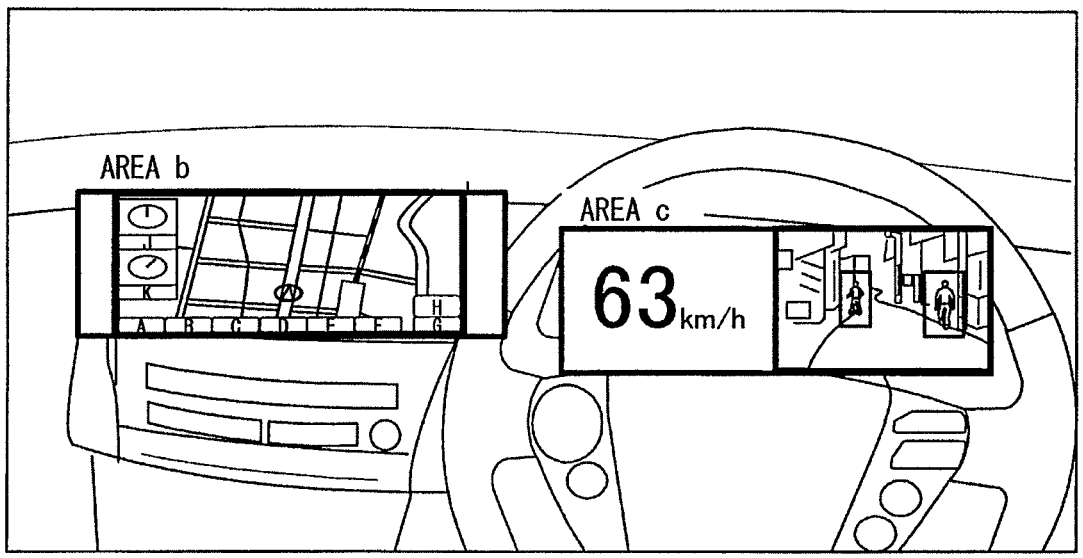
FIG. 20 is a diagram showing a display assignment result of display images.

As a result, as shown in FIG. 20, the "map" is displayed on the display area b, the "DIGI" is displayed on the display area f, and the "night view" is displayed on the display area g.

(c) Case A/D

In this example, an operator indicating the logical alternative denial is applied between the "DIGI" and the "ANAL". As shown in FIG. 21(a), the "ANAL", the "DIGI", and the "map" are in active state, and the "night view" is in inactive state.

At this time, the display image list is generated based on the display images in the active state (S110 in FIG. 7). Thus, the display image list of "ANAL, DIGI, map" is generated.

Then, the processing of the mandatory exclusion constraint expression is performed (S120 in FIG. 7). Since the mandatory exclusion constraint expression of "A/D" does not include the display image in the inactive state, the mandatory exclusion constraint expression after processing is also "A/D".

Then, based on the mandatory exclusion constraint expression, the display image combination list is generated (S130 in FIG. 7). Since one of the "ANAL" and "DIGI" is required to be necessarily displayed or neither A nor B is required to be displayed, as shown in FIG. 21(b), the display image combination list including five display image combinations of "ANAL", "DIGI", "ANAL, map", "DIGI, map", and "map" is generated.

Then, the display area combination list is generated (S140 in FIG. 7). As shown in FIG. 13(c), the display area combination list includes four display area combinations of "b, c", "b, f, g", "c, d, e", and "d, e, f, g".

Then, the assignment combination list is extracted (S150 in FIG. 7). Similar to the extraction method of the assignment combination list as described above, one display area combination is read out from the display area combination list. With respect to the readout display area combination, each display image combination of the display image combination list is assigned to the readout display area combination based on the assignment information. Then, available assignment combinations are extracted as the options of the assignment combination list. This extraction is performed to each of the display area combinations included in the display area combination list.

Figures 22A, 22B:
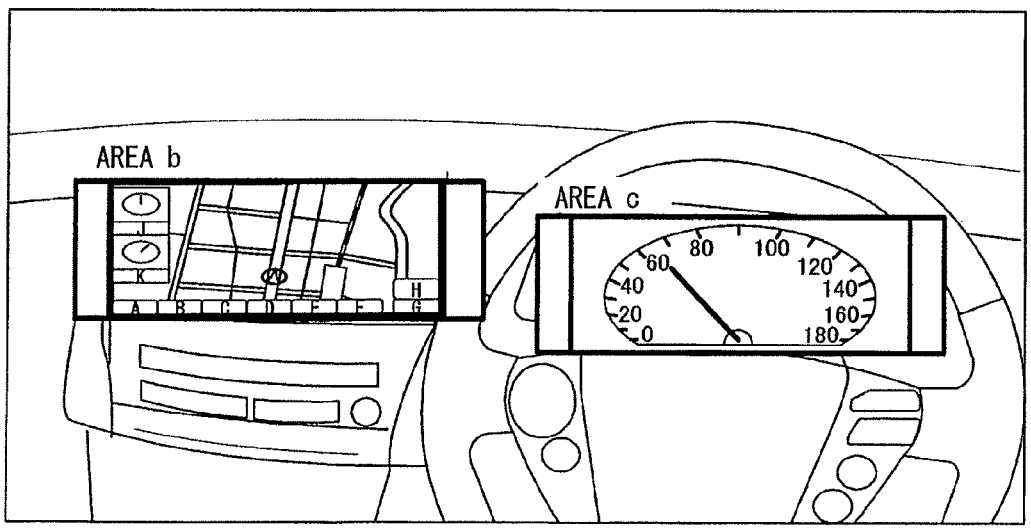
FIG. 22(a) is a diagram showing an assignment combination list.
FIG. 22(b) is a diagram showing a display assignment result of display images.

As a result, as shown in FIG. 22(a), the assignment combination list is extracted. The assignment combination list includes 13 options including "ANAL-c", "map-b, ANAL-c", "map-b", "DIGI-f", "map-b, DIGI-f", "DIGI-d", "ANAL-c, map-d", "ANAL-c, map-e", "DIGI-d, map-e", "map-d", "map-e", "map-d, DIGI-f", and "map-e, DIGI-f".

Then, with respect to each assignment included in each option, the evaluation value is calculated (S180 in FIG. 8). Then, in each option, a sum of the evaluation values of the assignments is calculated, and the option having the maximum sum of the evaluation values is selected (S240).

As shown in FIG. 22(a), the evaluation value is calculated with respect to each option as the following.

| | |
|---|---|
| 70×100=7000 | Option (1): |
| 20×50+70×100=8000 | Option (2): |
| 20×50=1000 | Option (3): |
| 50×90=4500 | Option (4): |
| 20×50+50×90=5500 | Option (5): |
| 50×20=1000 | Option (6): |
| 70×100+20×20=7400 | Option (7): |
| 70×100+20×30=7600 | Option (8): |
| 50×20+20×30=1600 | Option (9): |
| 20×20=400 | Option (10): |
| 20×30=600 | Option (11): |
| 20×20+50×90=4900 | Option (12): |
| 20×30+50×90=5100 | Option (13): |

Thus, in this case, the option (2) having a sum of the evaluation values equal to "8000" is selected.

With reference to the assignment combination of the selected option (2), the assignment of the display image to the display area is determined (S250 in FIG. 8), and the display images are displayed (S260).

As a result, as shown in FIG. 22(b), the "map" is displayed on the display area b, and the "ANAL" is displayed on the display area c.

(d) Case A & D

In this example, an operator indicating the logical conjunction is applied between the "DIGI" and the "ANAL". As shown in FIG. 23(a), the "ANAL", the "DIGI", the "map", and the "night view" are in active state.

At this time, the display image list is generated based on the display images in the active state (S110 in FIG. 7). Thus, the display image list of "ANAL, DIGI, map, night view" is generated.

Then, the processing of the mandatory exclusion constraint expression is performed (S120 in FIG. 7). Since the mandatory exclusion constraint expression of "A & D" does not include the display image in the inactive state, the mandatory exclusion constraint expression after processing is also "A & D".

Then, based on the mandatory exclusion constraint expression, the display image combination list is generated (S130 in FIG. 7). Since both the "ANAL" and the "DIGI" are required to be necessarily displayed, as shown in FIG. 23(b), the display image combination list including four display image combinations of "ANAL, DIGI", "ANAL, DIGI, map", "ANAL, DIGI, night view", and "ANAL, DIGI, map, night view" is generated.

Then, the display area combination list is generated (S140 in FIG. 7). As shown in FIG. 13(c), the display area combination list includes four display area combinations of "b, c", "b, f, g", "c, d, e", and "d, e, f, g".

Then, the assignment combination list is extracted (S150 in FIG. 7). Similar to the extraction method of the assignment combination list as described above, one display area combination is read out from the display area combination list. With respect to the readout display area combination, each display image combination of the display image combination list is assigned to the readout display area combination based on the assignment information. Then, available assignment combinations are extracted as the options of the assignment combination list. This extraction is performed to each of the display area combinations included in the display area combination list.

Figures 24A, 24B:
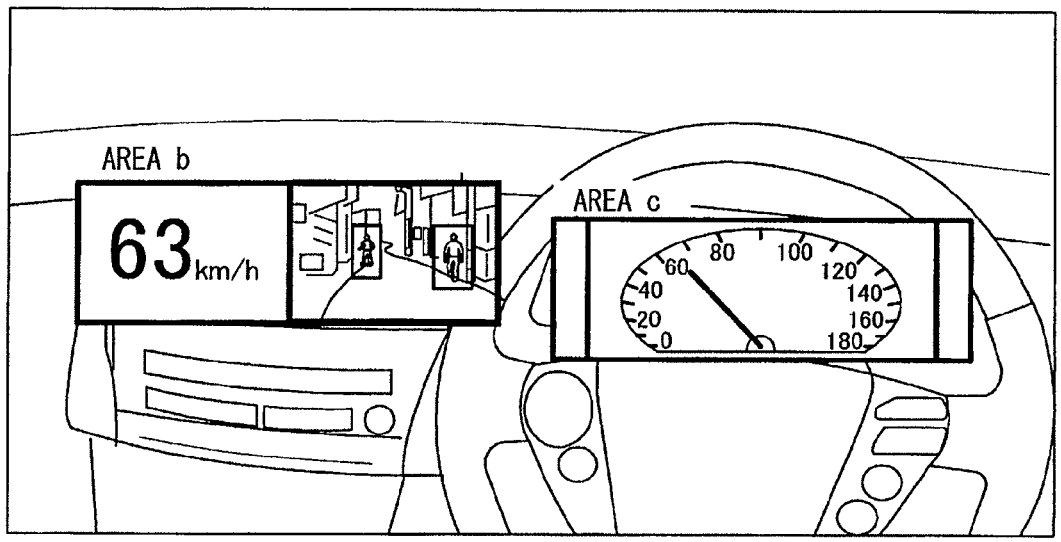
FIG. 24(a) is a diagram showing an assignment combination list.
FIG. 24(b) is a diagram showing a display assignment result of display images.

As a result, as shown in FIG. 24(a), the assignment combination list is extracted. The assignment combination list includes 3 options including "ANAL-c, DIG-d", "ANAL-c, DIGI-d, map-e", and "ANAL-c, DIGI-d, night view-e".

Then, with respect to each assignment included in each option, the evaluation value is calculated (S180 in FIG. 8). Then, in each option, a sum of the evaluation values of the assignments is calculated, and the option having the maximum sum of the evaluation values is selected (S240).

As shown in FIG. 24(a), the evaluation value is calculated with respect to each option as the following.

| | |
|---|---|
| 70×100+50×20=8000 | Option (1): |
| 70×100+50×20+20×30=8600 | Option (2): |
| 70×100+50×20+100×30=11000 | Option (3): |

Thus, in this case, the option (3) having a sum of the evaluation values equal to "11000" is selected.

With reference to the assignment combination of the selected option (3), the assignment of the display image to the display area is determined (S250 in FIG. 8), and the display images are displayed (S260).

As a result, as shown in FIG. 24(b), the "DIGI" is displayed on the display area d, the "night view" is displayed on the display area e, and the "ANAL" is displayed on the display area c.

(e) Case A+D

In this example, an operator indicating the equal value is applied between the "DIGI" and the "ANAL". As shown in FIG. 25(a), the "ANAL", the "DIGI", the "map", and the "night view" are in active state.

At this time, the display image list is generated based on the display images in the active state (S110 in FIG. 7). Thus, the display image list of "ANAL, DIGI, map, night view" is generated.

Then, the processing of the mandatory exclusion constraint expression is performed (S120 in FIG. 7). Since the mandatory exclusion constraint expression of "A+D" does not include the display image in the inactive state, the mandatory exclusion constraint expression after processing is also "A+D".

Then, based on the mandatory exclusion constraint expression, the display image combination list is generated (S130 in FIG. 7). Since both the "ANAL" and "DIGI" are required to be displayed together or neither the "ANAL" nor the "DIGI" is required to be displayed, as shown in FIG. 25(b), the display image combination list including seven display image combinations of "ANAL, DIGI", "ANAL, DIGI, map", "ANAL, DIGI, night view", "ANAL, DIGI, map, night view", "map", "night view", and "map, night view" is generated.

Then, the display area combination list is generated (S140 in FIG. 7). As shown in FIG. 13(c), the display area combination list includes four display area combinations of "b, c", "b, f, g", "c, d, e", and "d, e, f, g".

Then, the assignment combination list is extracted (S150 in FIG. 7). Similar to the extraction method of the assignment combination list as described above, one display area combination is read out from the display area combination list. With respect to the readout display area combination, each display image combination of the display image combination list is assigned to the readout display area combination based on the assignment information. Then, available assignment combinations are extracted as the options of the assignment combination list. This extraction is performed to each of the display area combinations included in the display area combination list.

Figures 26A, 26B:
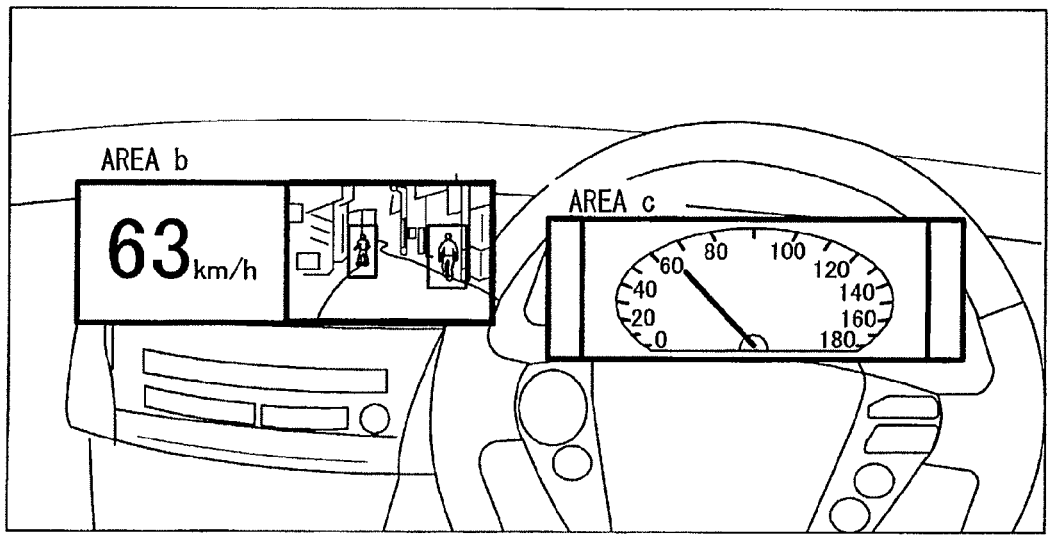
FIG. 26(a) is a diagram showing an assignment combination list.
FIG. 26(b) is a diagram showing a display assignment result of display images.

As a result, as shown in FIG. 26(a), the assignment combination list is extracted. The assignment combination list includes 12 options including "map-b", "night view-g", "map-b, night view-g", "ANAL-c, digital-d", "ANAL-c, digital-d, map-e", "ANAL-c, DIGI-d, night view-e", "map-d", "night view-e", "map-d, night view-e", "map-e", "map-d, night view-g", and "map-e, night view-g".

Then, with respect to each assignment included in each option, the evaluation value is calculated (S180 in FIG. 8). Then, in each option, a sum of the evaluation values of the assignments is calculated, and the option having the maximum sum of the evaluation values is selected (S240).

As shown in FIG. 26(a), the evaluation value is calculated with respect to each option as the following.

| | |
|---|---|
| 20×50=1000 | Option (1): |
| 100×80=8000 | Option (2): |
| 20×50+100×80=9000 | Option (3): |
| 70×100+50×20=8000 | Option (4): |
| 70×100+50×20+20×30=8600 | Option (5): |
| 70×100+50×20+100×30=11000 | Option (6): |
| 20×20=400 | Option (7): |
| 100×30=3000 | Option (8): |
| 20×20+100×30=3400 | Option (9): |
| 20×80=1600 | Option (10): |
| 20×20+100×80=8400 | Option (11): |
| 20×80+100×80=9600 | Option (12): |

Thus, in this case, the option (6) having a sum of the evaluation values equal to "11000" is selected.

With reference to the assignment combination of the selected option (6), the assignment of the display image to the display area is determined (S250 in FIG. 8), and the display images are displayed (S260).

As a result, as shown in FIG. 26(B), the "DIGI" is displayed on the display area d, the "night view" is displayed on the display area e, and the "ANAL" is displayed on the display area c.

(e) Case A|D

In this example, an operator indicating the logical disjunction is applied between the "DIGI" and the "ANAL". As shown in FIG. 27(a), the "ANAL", the "DIGI", and the "map" are in active state, and the "night view" is in inactive state.

At this time, the display image list is generated based on the display images in the active state (S110 in FIG. 7). Thus, the display image list of "ANAL, DIGI, map" is generated.

Then, the processing of the mandatory exclusion constraint expression is performed (S120 in FIG. 7). Since the mandatory exclusion constraint expression of "A|D" does not include the display image in the inactive state, the mandatory exclusion constraint expression after processing is also "A|D".

Then, based on the mandatory exclusion constraint expression, the display image combination list is generated (S130 in FIG. 7). Since at least one of the "ANAL" or "DIGI" is required to be necessarily displayed, as shown in FIG. 27(b), the display image combination list including six display image combinations of "ANAL", "DIGI", "ANAL, digital", "ANAL, map", "DIGI, map", "ANAL, DIGI, map" is generated.

Then, the display area combination list is generated (S140 in FIG. 7). As shown in FIG. 13(c), the display area combination list includes four display area combinations of "b, c", "b, f, g", "c, d, e", and "d, e, f, g".

Then, the assignment combination list is extracted (S150 in FIG. 7). Similar to the extraction method of the assignment combination list as described above, one display area combination is read out from the display area combination list. With respect to the readout display area combination, each display image combination of the display image combination list is assigned to the readout display area combination based on the assignment information. Then, available assignment combinations are extracted as the options of the assignment combination list. This extraction is performed to each of the display area combinations included in the display area combination list.

Figures 28A, 28B:
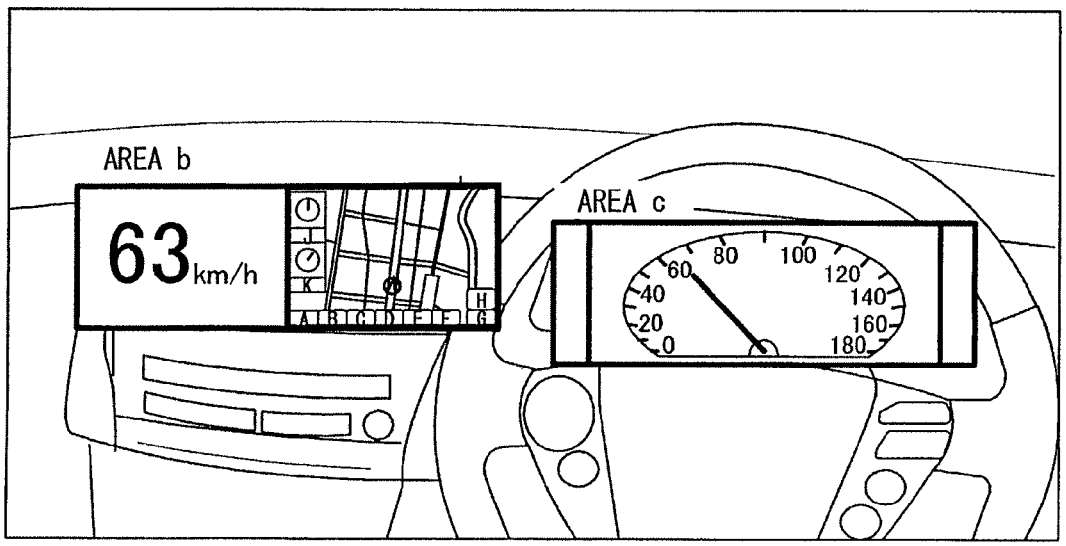
FIG. 28(a) is a diagram showing an assignment combination list.
FIG. 28(b) is a diagram showing a display assignment result of display images.
Figure 29:
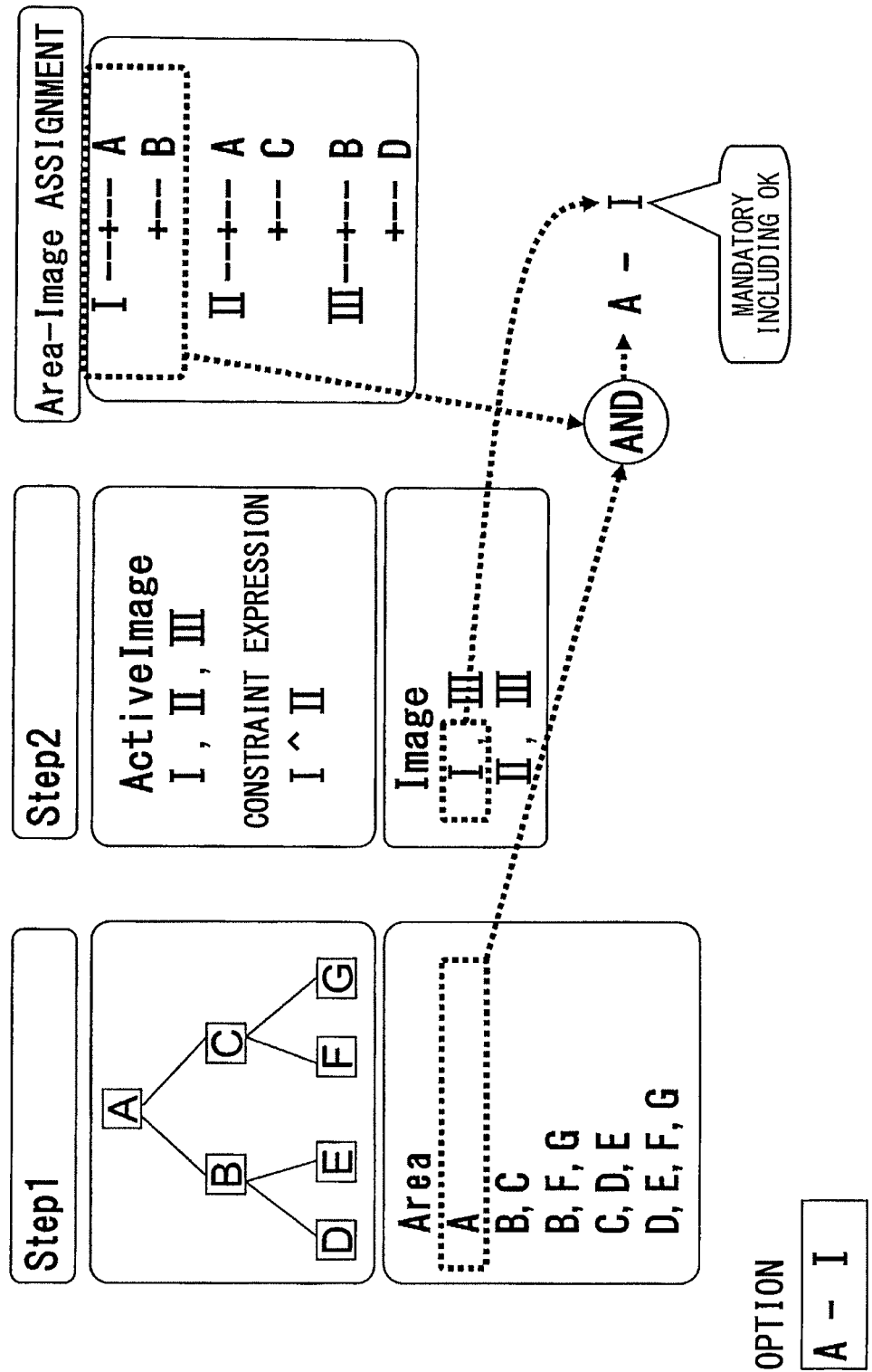
FIG. 29 is a diagram showing examples of an assignment combination option extracted from an assignment combination list.
Figure 30:
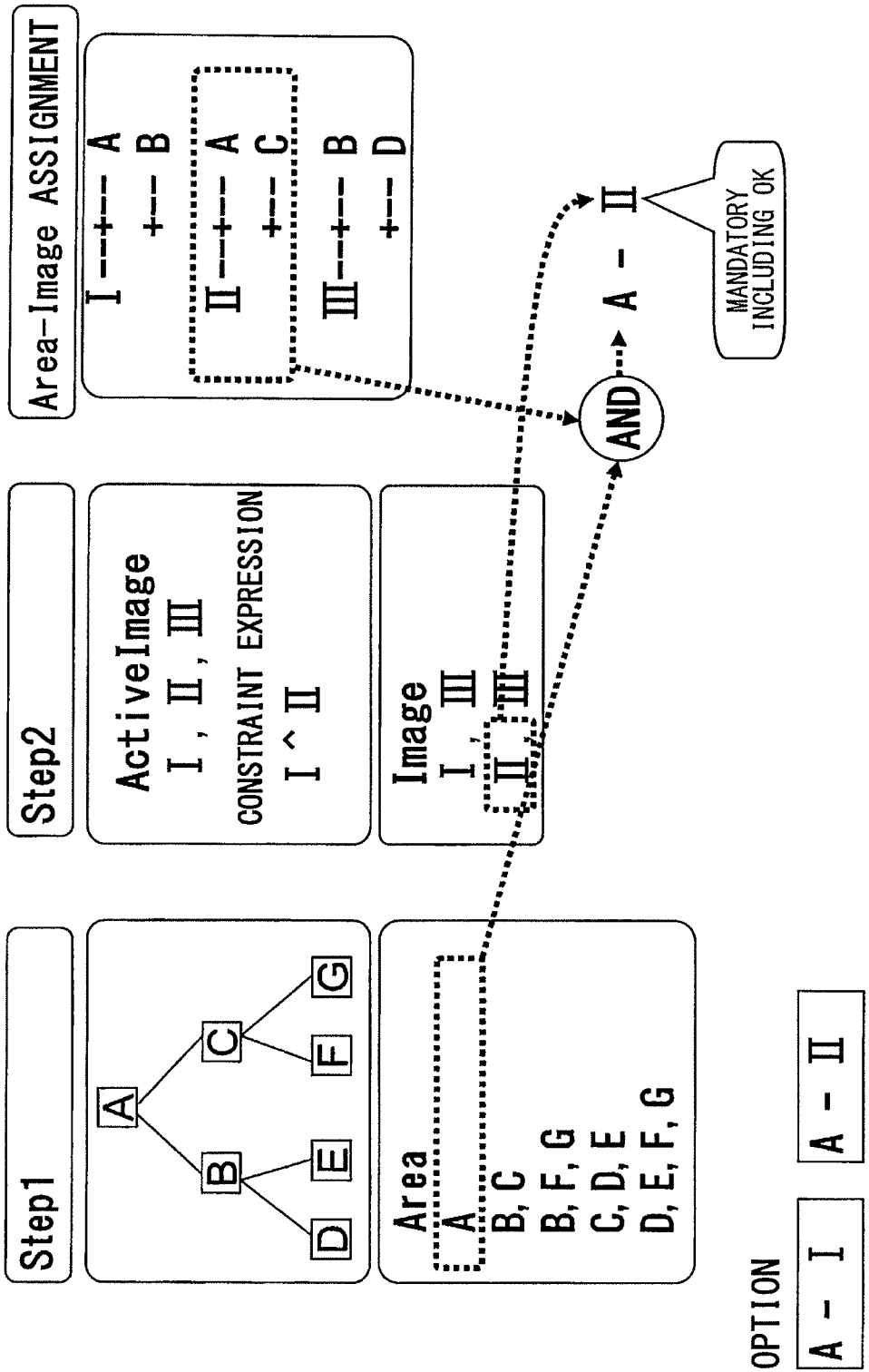
FIG. 30 is a diagram showing examples of assignment combination options extracted from an assignment combination list.
Figure 31:
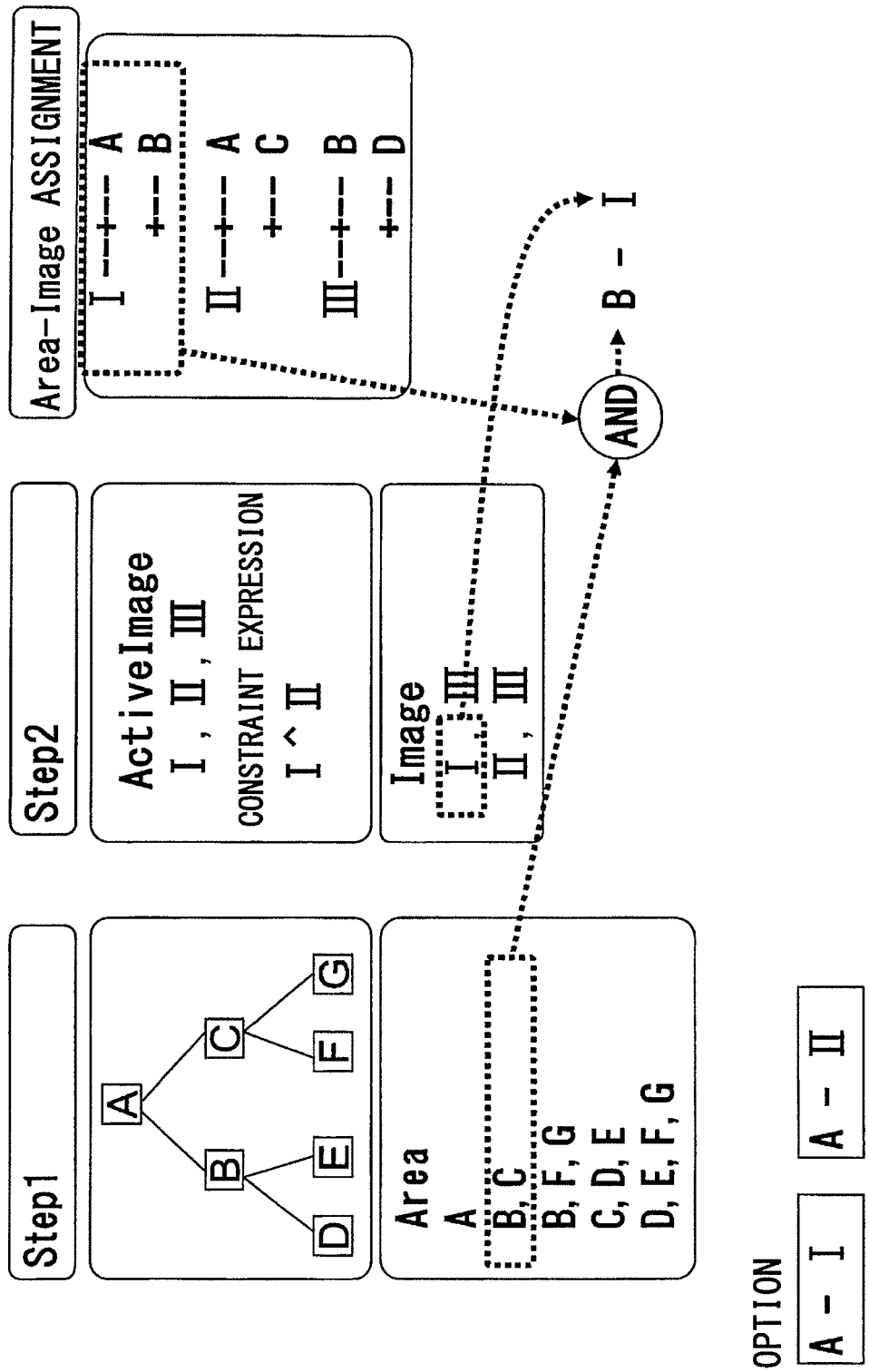
FIG. 31 is a diagram showing examples of assignment combination options extracted from an assignment combination list.
Figure 32:
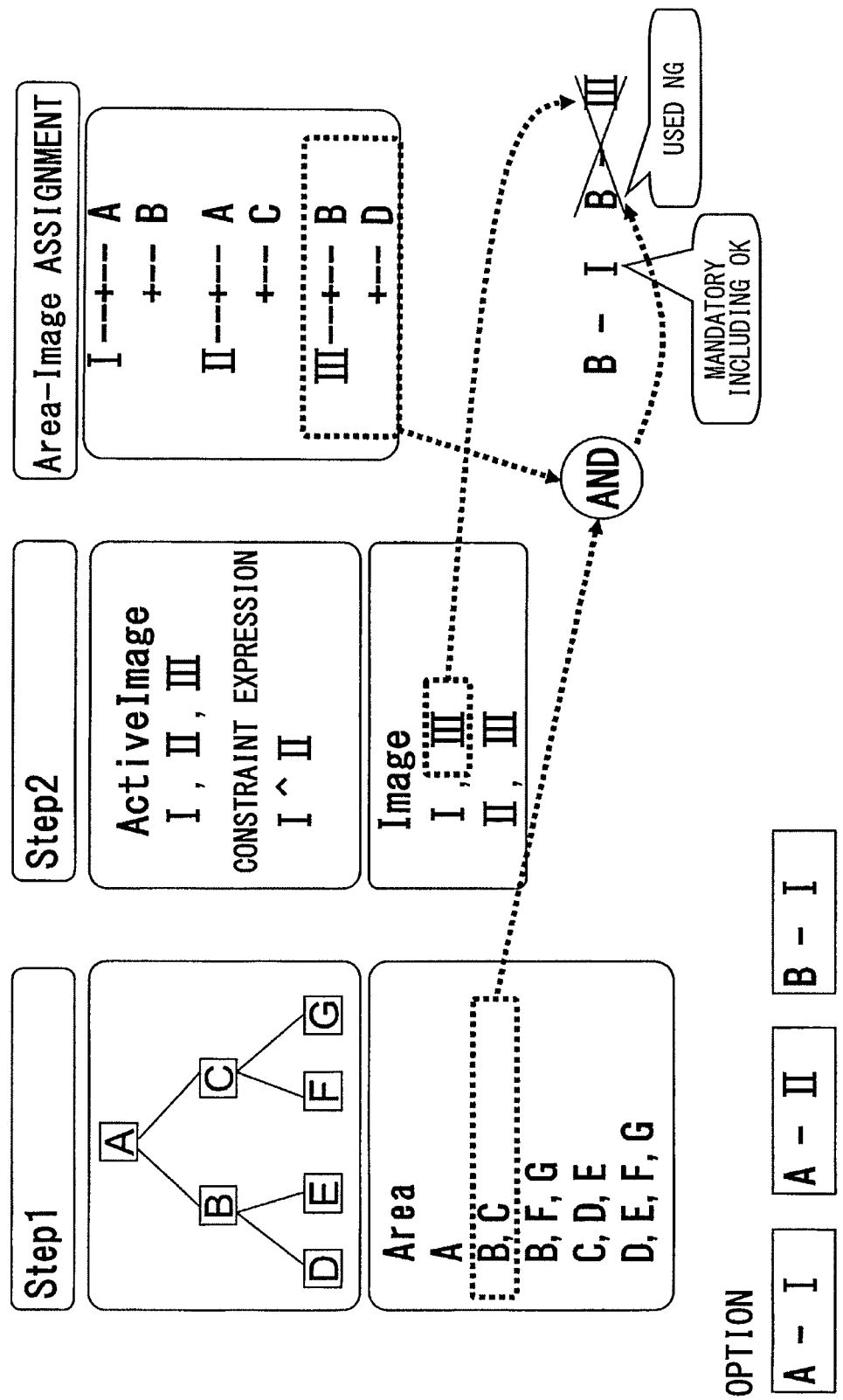
FIG. 32 is a diagram showing examples of assignment combination options extracted from an assignment combination list.
Figure 33:
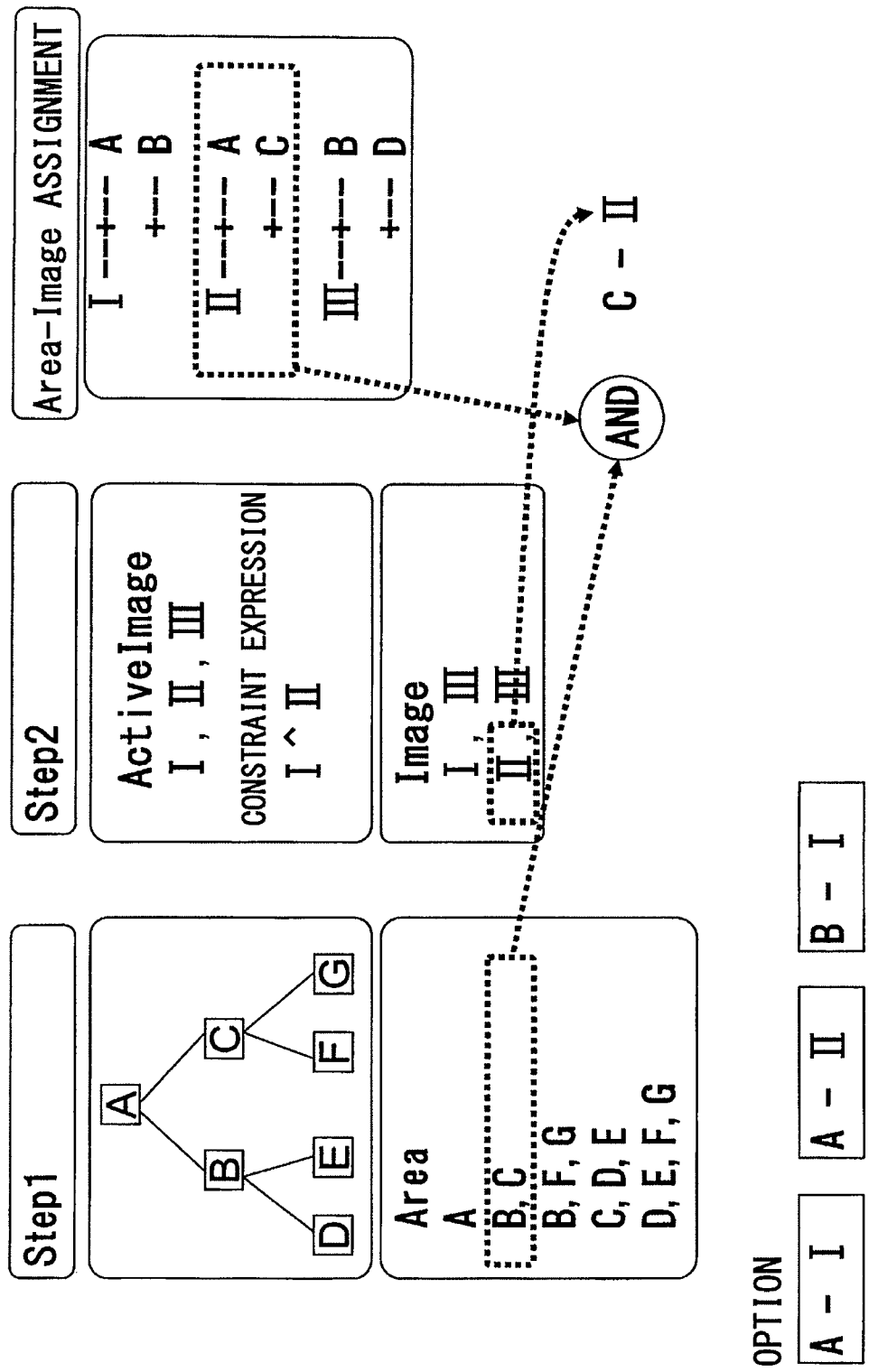
FIG. 33 is a diagram showing examples of assignment combination options extracted from an assignment combination list.
Figure 34:
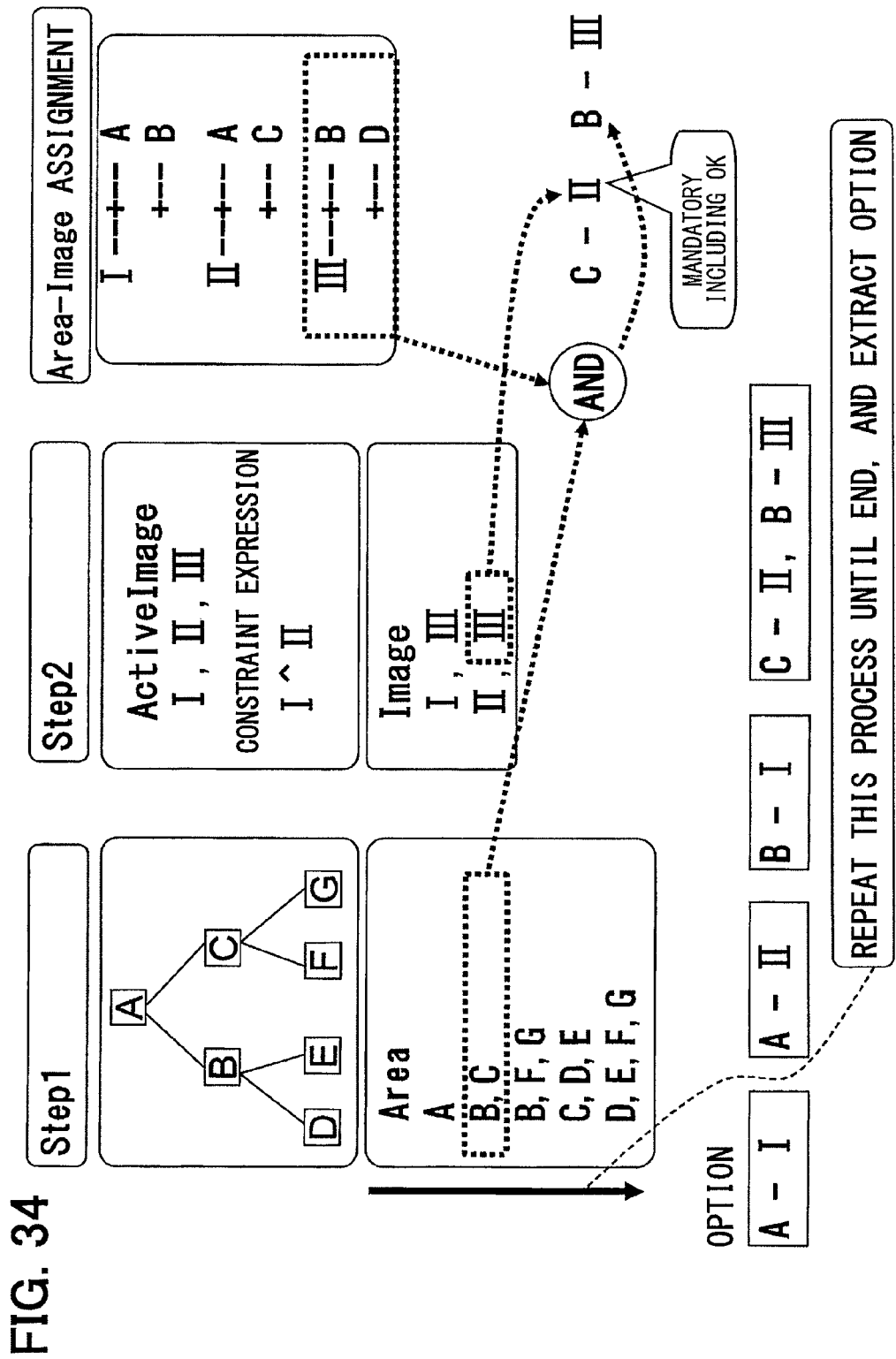
FIG. 34 is a diagram showing examples of assignment combination options extracted from an assignment combination list.

As a result, as shown in FIG. 28(a), the assignment combination list is extracted. The assignment combination list includes 12 options including "ANAL-c", "map-b, ANAL-c", "DIGI-f", "map-b, DIGI-f", "DIGI-d", "ANAL-c, DIGI-d", "ANAL-c, map-d", "ANAL-c, map-e", "ANAL-c, DIGI-d, map-e", "DIGI-d, map-e", "map-d, DIGI-f", and "map-e, DIGI-f".

Then, with respect to each assignment included in each option, the evaluation value is calculated (S180 in FIG. 8). Then, in each option, a sum of the evaluation values of the assignments is calculated, and the option having the maximum sum of the evaluation values is selected (S240).

As shown in FIG. 28(a), the evaluation value is calculated with respect to each option as the following.

| | |
|---|---|
| 70×100=7000 | Option (1): |
| 20×50+70×100=8000 | Option (2): |
| 50×90=4500 | Option (3): |
| 20×50+50×90=5500 | Option (4): |
| 50×20=1000 | Option (5): |
| 70×100+50×20=8000 | Option (6): |
| 70×100+20×20=7400 | Option (7): |
| 70×100+20×30=7600 | Option (8): |
| 70×100+50×20+20×30=8600 | Option (9): |
| 50×20+20×30=1600 | Option (10): |
| 20×20+50×90=4900 | Option (11): |
| 20×30+50×90=5100 | Option (12): |

Thus, in this case, the option (9) having a sum of the evaluation values equal to "8600" is selected.

With reference to the assignment combination of the selected option (9), the assignment of the display image to the display area is determined (S250 in FIG. 8), and the display images are displayed (S260).

As a result, as shown in FIG. 28(b), the "DIGI" is displayed on the display area d, the "map" is displayed on the display area e, and the "ANAL" is displayed on the display area c.

The following will describe advantages provided by the display control apparatus 1 according to the present embodiment.

The display control apparatus 1 according to the present embodiment includes the display image managing section 11, the display area managing section 12, the assignment managing section 13, and the display image assignment control section 14. The assignment managing section 13 stores the mandatory exclusion constraint expression as the mandatory exclusion information. The mandatory exclusion information defines the display image combinations to be displayed.

The display image assignment control section 14 processes the mandatory exclusion constraint expression stored in the assignment managing section 13 (S120 in FIG. 7). The display image assignment control section 14 generates the display image list including the display images to be displayed (S130). The display image assignment control section 14 determines the assignment combination of the display image and the display area based on the display image list.

That is, the display image list including the display image to be displayed is processed based on the mandatory exclusion constraint expression. Then, the assignment combination of the display image and the display area is determined based on the display image combination list, which is generated based on the display image list. With this configuration, multiple display images are able to be assigned to multiple display areas under a condition that the assignment combinations of the display images to be displayed satisfy a predetermined relation.

In the present embodiment, the display image combinations included in the display image combination list are mechanically assigned to the display areas by performing a predetermined comparison calculation. Specifically, assignment combination options of the display images and the display areas are extracted as the assignment combination list (S150 in FIG. 7). Then, in each assignment combination option of the combination list, the evaluation value is calculated with respect to each assignment (S180 in FIG. 8). Then, the assignment combination option having the maximum sum of the evaluation values is selected (S240) and the assignment of the display image to the display area is determined (S250). That is, the display image assignment control section 14 generates the assignment combination list that includes the assignment combination options of the display images and the display areas. Herein, the display images are included in the display image combination list. Then, the display image assignment control section 14 calculates the evaluation value for each option included in the assignment combination list, and performs the comparison calculation in order to compare the multiple sums of evaluation values. Then, the display image assignment control section 14 selects the option having the maximum sum of evaluation value and determines the assignment of the display image to the display area. With this configuration, the combination of the display images satisfies the mandatory exclusion constraint expression and the display image can be properly assigned to the display area with consideration of a relation between the display image and the display area.

In the present embodiment, the mandatory exclusion constraint expressions are defined by the operators shown in FIG. 5(a) and FIG. 5(b). That is, the mandatory exclusion information defines the combination of the display images with the predetermined operators. With this configuration, a complicated relation of the display images can be expressed in a relatively simplified way.

Specifically, the operator "&", which indicates a display of both A and B, is used in the present embodiment. That is, the operators in the present embodiment include the operator indicating the logical conjunction in mathematical logic.

The operator "|", which indicates a display of at least one of A or B, is used in the present embodiment. That is, the operators in the present embodiment include the operator indicating the logical disjunction in mathematical logic.

The operator "^", which indicates a display of one of A and B, is used in the present embodiment. That is, the operators in the present embodiment include the operator indicating the logical exclusive disjunction in mathematical logic.

The operator "/", which indicates a display of one of A and B or a display of neither A nor B, is used in the present embodiment. That is, the operators in the present embodiment include the operator indicating the logical alternative denial in mathematical logic.

The operator "+", which indicates a display of both A and B or a display of neither A nor B, is used in the present embodiment. That is, the operators in the present embodiment include the operator indicating the equal value in mathematical logic.

With utilization of above-described operators, the complicated combination of the display images can be expressed in a relatively simplified way.

In the present embodiment, the display image managing section 11 manages the "display state" as a property of the display image. The display state is an information indicating whether the display image is the display target to be displayed or not. The display state is set to the "active state", which indicates the display image is the display target, or to the "inactive state", which indicates the display image is not the display target. That is, the display image managing section 11 stores the display state associated with the display image. Herein, the display state is set to the active state, which indicates the display image is the display target, or the inactive state, which indicates the display image is not the display target. With this configuration, the display images to be displayed can be managed in a simplified way.

The display state of each display image is switched between the "active state" and the "inactive state" corresponding to the vehicle state and the operation performed by the user. That is, the display image managing section 11 switches the display state of the display image based on the information acquired from the vehicle. With this configuration, a switch of one display image to another display image can be achieved corresponding to the vehicle state and the operation performed by the user.

In the present embodiment, as shown in FIG. 6(*a*), when the display image Y is in the "inactive state" regarding the exclusion constraint expression "(X & Y)^Z", the display image Y and the related operator at the higher hierarchy are deleted as shown by the dashed line J. The operators "|" and "^" shown in FIG. 5(*a*) are processed in a similar way. As shown in FIG. 6(*c*), when the display image Y is in the "inactive state" regarding the exclusion constraint expression "X/Y", the display image Y and the related operator "/" at the higher hierarchy are deleted as shown by the dashed line L. Further, the display image X at the lower hierarchy of the deleted operator "/" is also deleted as shown by the dashed line K. That is, when the mandatory exclusion information includes the display image in the inactive state, the display image assignment control section 14 processes the mandatory exclusion information corresponding to the operator with one of the methods shown in the following (1) or following (2), and then, generates the display image combination list.

(1) The display image in the inactive state is deleted from the mandatory exclusion information, and the operator related to the display image in the inactive state is also deleted.

(2) The display image in the inactive state and the operator related to the display image in the inactive state are deleted together, and another display image related to the deleted operator is further deleted.

With this method, even when the display image other than the display target, that is, the display image in the inactive state is included in the mandatory exclusion constraint expression, the mandatory exclusion constraint expression can be processed in a relatively simplified way. As a result, the mandatory exclusion constraint expression can be generated without differentiating the display image to be displayed or the display image not to be displayed.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A display control apparatus assigning, with respect to a plurality of display areas included in a display screen of a display apparatus, at least one display image to one of the plurality of display areas, comprising:
   a display image managing section storing an image information related to the at least one display image;
   a display area managing section storing an area information related to each of a plurality of display areas;
   a mandatory exclusion information storing section storing a mandatory exclusion information that is utilized in a determination of a plurality of display image combinations so that each of the plurality of display image combinations includes the at least one display image; and
   a display image assignment control section determining the plurality of display image combinations based on the mandatory exclusion information and generating a display image combination list including the plurality of display image combinations, the display image assignment control section assigning the at least one display image to the one of the plurality of display areas by using a predetermined calculation based on the display image combination list,
   wherein the display image assignment control section:
      generates an assignment combination list including a plurality of assignment combinations, each of the plurality of assignment combinations is a combination of (i) each of the plurality of display image combinations included in the display image combination list and (ii) each of the plurality of display areas;
      calculates, with respect to each of the plurality of assignment combinations included in the assignment combination list, an evaluation value based on the image information and the area information;
      performs the predetermined calculation to compare the evaluation value of each of the plurality of assignment combinations with one another; and
      selects an assignment combination having a maximum evaluation value from the plurality of assignment combinations, and assigns the at least one display image to at least one of the plurality of display areas based on the assignment combination that is selected;
      controls the display apparatus to display the at least one display image on at least one of the plurality of display areas in accordance with the selected assignment combination.

2. The display control apparatus according to claim 1, wherein the mandatory exclusion information defines each of the display image combinations included in the display image combination list with one of a plurality of predetermined operators.

3. The display control apparatus according to claim 2, wherein the plurality of predetermined operators include an operator indicating logical conjunction in mathematical logic.

4. The display control apparatus according to claim 2, wherein the plurality of predetermined operators include an operator indicating logical disjunction in mathematical logic.

5. The display control apparatus according to claim 2, wherein the plurality of predetermined operators include an operator indicating logical exclusive disjunction in mathematical logic.

6. The display control apparatus according to claim 2, wherein the plurality of predetermined operators include an operator indicating logical alternative denial in mathematical logic.

7. The display control apparatus according to claim 2, wherein the plurality of predetermined operators include an operator indicating equal value in mathematical logic.

8. The display control apparatus according to claim 2 wherein:
the display image managing section stores a display state associated with the at least one display image and switches the display state of the at least one display image between an active state and an inactive state;
the active state indicates that the at least one display image is set as a display target; and
the inactive state indicates that the at least one display image is not set as the display target.

9. The display control apparatus according to claim 8, wherein the display image managing section switches the display state of the at least one display image between the active state and the inactive state based on information acquired from a vehicle in which the display screen is disposed the vehicle.

10. The display control apparatus according to claim 9, wherein:
when the mandatory exclusion information includes a display image that is in the inactive state, the display image assignment control section processes the mandatory exclusion information corresponding to the plurality of predetermined operators with one of the following two methods including (i) deleting, from the mandatory exclusion information, the display image that is in the inactive state and one of the plurality of predetermined operators related to the display image that is in the inactive state, and (ii) deleting, from the mandatory exclusion information, the display image that is in the inactive state, the one of the plurality of predetermined operators related to the display image that is in the inactive state, and a different display image related to the one of the plurality of predetermined operators related to the display image that is in the inactive state; and
the display image assignment control section generates the display image combination list after a processing of the mandatory exclusion information.

11. The display control apparatus according to claim 1, wherein the image information, on which the evaluation value is calculated for each of the plurality of assignment combinations, includes values for each of a plurality of target users; and the target area information, on which the evaluation value is calculated for each of the plurality of assignment combinations, includes values for each of the plurality of target users.

12. The display control apparatus according to claim 1, wherein the image information, on which the evaluation value is calculated for each of the plurality of assignment combinations, includes values for each target user to which the at least one display image is displayed; and the target area information, on which the evaluation value is calculated for each of the plurality of assignment combinations, includes values for the each target user to which the at least one display image is displayed.

* * * * *